United States Patent [19]

Miyawaki et al.

[11] Patent Number: 5,786,909
[45] Date of Patent: Jul. 28, 1998

[54] PHOTOGRAPHIC PRINTING APPARATUS WITH EXPOSURE POSITION RECTIFYING AND METHOD THEREOF

[75] Inventors: Hiroshi Miyawaki, Wakayama; Mitsuhiko Itojima, Naga-gun; Hiroto Nakao, Waka yama; Takayuki Oka, Wakayama; Hisahiro Maeda, Wakayama; Masaaki Tsuji, Hannan; Toshiro Akira, Wakayama, all of Japan

[73] Assignee: Noritsu Koki Co., Ltd., Wakayama, Japan

[21] Appl. No.: 162,188

[22] PCT Filed: Apr. 13, 1993

[86] PCT No.: PCT/JP93/00472

§ 371 Date: Dec. 16, 1993

§ 102(e) Date: Dec. 16, 1993

[87] PCT Pub. No.: WO93/21559

PCT Pub. Date: Oct. 28, 1993

[30] Foreign Application Priority Data

| Apr. 17, 1992 | [JP] | Japan | 4-124312 |
| Apr. 22, 1992 | [JP] | Japan | 4-129549 |
| May 21, 1992 | [JP] | Japan | 4-153078 |
| May 21, 1992 | [JP] | Japan | 4-153079 |
| Jun. 26, 1992 | [JP] | Japan | 4-193083 |

[51] Int. Cl.$^6$ .................. G03B 13/18; G03B 27/52; G03B 15/14; G03F 3/10
[52] U.S. Cl. ................ 358/527; 396/89; 355/55; 359/354; 359/813
[58] Field of Search ................ 354/105, 114, 354/115, 119, 121, 125, 190, 75, 76, 159; 358/527; 359/354, 676, 694, 811, 813; 355/40, 55, 56; 396/89, 133, 298; 395/101, 102

[56] References Cited

U.S. PATENT DOCUMENTS 4,656,525  4/1987  Norris ........................ 358/909.1
4,716,470  12/1987  Levine ........................ 354/476
4,823,156  4/1989  Shrader et al. .............. 354/115

(List continued on next page.)

FOREIGN PATENT DOCUMENTS

| 59-100421 | 6/1984 | Japan . |
| 60-35723 | 2/1985 | Japan . |
| 61-275736 | 12/1986 | Japan . |
| 62-23032 | 1/1987 | Japan . |
| 62-151832 | 7/1987 | Japan ............... H04N 1/04 |
| 62-151833 | 7/1987 | Japan . |
| 1-179136 | 7/1989 | Japan . |
| 1-306821 | 12/1989 | Japan . |

*Primary Examiner*—Edward L. Coles, Sr.
*Assistant Examiner*—Kimberly A. Williams
*Attorney, Agent, or Firm*—McDermott, Will & Emery

[57] ABSTRACT

A photographic printing apparatus including a lens controlled to be positioned at a printing position, immediately adjacent a film negative, during photographic printing operation of the apparatus and at a normal position, displaced from the film negative, during other operations of the apparatus. Positioning the lens at the normal position, displaced from the film negative, enables the lens to be more easily protected and adjusted. The apparatus further includes a sample print detector apparatus comprising a CCD camera for capturing the sample print for display on a video monitor with a print position recognizing cursor. Key-subject points are specified with the cursor and mismatch between the key-subject points is determined in order to provide correction of filming-position. A rotating mechanism is also provided for rotating a negative mask member, lens member and exposure station by an identical angle of rotation to obtain a predetermined angle of exposure. Moving elements are provided for the enlarging lens and exposure station in order to execute printing by trimming. The apparatus also has an edge-shaper for machining photographic paper cut by a cutter to remove wastes on the frontal region of the leading edge of the photographic paper. The edge-shaper machines in a direction perpendicular to the direction in which the photographic paper advances through the apparatus, and the removed wastes are routed to a waste-box by a suction mechanism.

1 Claim, 42 Drawing Sheets

U.S. PATENT DOCUMENTS

| | | |
|---|---|---|
| 4,903,069 | 2/1990 | Lam ............................. 355/22 |
| 5,023,728 | 6/1991 | Nimura et al. ................ 358/437 |
| 5,028,950 | 7/1991 | Fritsch ......................... 355/22 |
| 5,151,726 | 9/1992 | Iwashita et al. .............. 354/105 |
| 5,400,096 | 3/1995 | Kamada et al. ............... 354/112 |
| 5,424,801 | 6/1995 | Lo et al. ....................... 355/22 |
| 5,502,480 | 3/1996 | Kuga et al. ................... 348/135 |

PHOTOGRAPHIC PRINTING APPARATUS WITH EXPOSURE POSITION RECTIFYING AND METHOD THEREOF

TECHNICAL FIELD OF THE INVENTION

This invention relates to a printing and development apparatus that can print conventional as well as three dimentional (3D) photographs.

BACKGROUND OF THE RELATED ART

In 3D photography where lenticular sheets are used, there are several general methods for producing 3D photographs, and one of which is what is called the indirect method. In the indirect method, several frames of negatives are prepared for an object, which has a depth and consists of a main object, a foreground and a background, and with photographic angle varied, each negative is printed on a photographic paper containing lenticular sheets, which is then developed to obtain a 3D photograph.

The multiple frames of negatives that are prepared in advance in this method are those that are photographed from stations on either a straight line parallel to the object or a line drawn through the center of the object. Depending on the photographing station, it is possible to prepare negatives that differ with respect to the positions of images of the main object and foreground and the main object and background. Though it is good to increase the number of photographing stations and thus the number of frames of negatives for superior 3D photography, it is the normal practice to have 3 to 5 frames for the sake of simplicity in photographing.

Photographic papers containing lenticular lenses are prepared either by coating with sensitized material the back side of a transparent plastic sheet that acts as lenticular lenses, or by pasting on the plastic sheet a sheet, which is coated with sensitized material. Printing takes place using a set of negatives prepared beforehand by exposure from the side of lenticular lenses, starting from one end of a negative to other the end in the order of photographic stations.

As for varying photographic angle in printing, there are several methods, and frequently used are the printing apparatuses that are generally equipped with fixed-type negative masks and mechanisms to move horizontally lens and exposure station. If the image of each negative is printed onto a single sheet of photographic paper containing lenticular sheet, having varied for each negative the photographic angle, the images become discretized and contracted into line images by the lenticular lenses and are repetitively arranged on the photosensitive layer in correspondence with the direction of photographing.

Though, a negative generally consists of 3 to 5 frames, also frequently practiced are exposure of negatives more than once with the photographic angle changed for each negative, as a means of obtaining reasonably good 3D photographs in a minimum photographing effort. For instance, with regard to a three-frame negative, it is possible to obtain a 3D photograph at the fourth (No. 4) exposure, if negative frames one each obtained at the two extremes of the photographic stations are used in printing in No. 1 and No. 4 exposures, and a single frame of the negative obtained at the central photographic station is used twice in printing in No. 2 and No. 3 exposures.

When 7 exposures are to take place with regard to a three-frame negative, it is possible to obtain a 3D photograph if, the two frames of the negative each obtained at the two extremes of the photographic stations are each twice used in printing in No. 1, No. 2, No. 6, No. 7 and No. 4 exposures, and the single frame of the negative obtained at the central photographic station is thrice used in printing in No. 3, No. 4 and No. 5 exposures. When making the negatives, it is necessary to maintain the accuracy in each exposure by having the center of each exposure coincident with those of the others, and therefore, slight changes in the center of exposure arising from displacement errors in the lens and exposure station mechanisms are rectified.

The method of rectification is exemplified for a 3-frame negative in the case of a four-exposure printing. In order to correct the changes in the center of exposure, focuscharts with three kinds of patterns are prepared in correspondence to the three-frame negative. The focus chart corresponding to the negative to be used in No. 1 and No. 3 exposures is printed onto a 2D photographic paper from each of the exposure station. The change in position of patterns of the focus chart printed onto the photographic paper from exposure stations No. 1 and No. 3 are measured with a magnifier.

Next, focus charts corresponding to the negatives to be used in No. 3 and No. 3, and No. 3 and No. 4 exposures are printed onto a photographic paper from the respective exposure stations. The changes in position of patterns of the charts corresponding to exposures No. 1 and No. 3, and No. 3 and No. 4 are measured, and having obtained the correction needed from the three position changes, the lens position is adjusted manually so that the centers of exposure coincide.

Although there are several methods in 3D photography using lenticular lenses, printing apparatus of the present invention generally uses a method called an "indirect method." In the indirect method, a camera that is loaded with a conventional sensitized film is horizontally displaced by fixed amounts with respect to the 3D object to make a number of negatives for the same single object. These negative films are such that they have the object images in the film at different locations in accordance with the distance to the object from the camera.

Apart from this method of photography where the camera is moved horizontally in straight lines, there are photographic methods where the camera is moved with respect to the object in an arc. In either of these methods, it is necessary to get several object images from different viewing points.

Other than moving the camera for photographing, it is also adequate for the negatives to be prepared with a camera that has a multiple of lenses arranged horizontally or with a multiple of cameras horizontally arranged and operate simultaneously. As to the number of negatives required, there is no specification; 3 to 5 negatives are common.

In the indirect method, the multiple negatives obtained in the above mentioned process are each exposed, by having the photographic angle varied for the each negative, onto a photosensitive film containing a lenticular sheet that is fabricated by applying a photosensitive material on the smooth side of the lenticular sheet. When an image is projected onto a photographic paper containing a lenticular sheet from a negative by an ordinary projection lens, the image developed onto the photosensitive layer, which is on the back side of the lenticular lenses, will be divided at each lenticular lens into line images owing to the fact that the lenticular lenses contract images on one side.

As the next step, the next negative in the order is exposed with the relative positions of the projection lens and the photographic paper containing a lenticular sheet changed so that a new line image is developed next to the line image that was developed in the previous exposure. Likewise, the reverse side of the lenticular lens is successively filled with line images from each negative. In that manner, it is possible to print images from several negatives onto a single sheet of photographic printing paper. This printing can also be done using a multiple of projection lenses, with a single exposure.

The photographic paper containing the lenticular sheet, in which a print was obtained as described above, is then developed. When viewed from the side of the lenticular lens, the line images formed on the photosensitive layer are expanded again on one side by the lenticular lens and will be seen as a restored image. In addition, a viewer will see from its either eye a different image of what has been systematically photographed, the result of which is that the two images that the viewer sees become superimposed and will be seen as a three dimensional image.

FIG. 1 shows a diagram of a photographic printing apparatus that uses the "indirect method" in conventional 3D photography. Printing of 3D photographs in the indirect method takes place in a multiple of repetitive exposures with the exposure angle changed. In conventional systems, a desired exposure angle can be obtained by moving the lens member1 and exposure station 2, as shown in FIG. 1, with slide mechanisms so as to displace horizontally the photographic printing paper containing a lenticular sheet and negative film while keeping their mutual parallel status. It is also possible to obtain a desired exposure angle by making movable either the negative mask member 3 that includes the negative film and the exposure station 2 with the lens member secured or making movable the negative mask section 3 and the lens member with the exposure station 2 secured.

In commonly used conventional printing apparatuses, the lens unit is of fixed-lens type, and therefore, lens adjustments have to be made by loosening the rings and bolts that are provided for adjusting light axis and focal point. When it is required to change the magnification factor, the enlarging lens is switched and the focal length is adjusted by having the exposure station displaced.

A conventional printing and development apparatus is described using diagrams. FIG. 2 is a schematic diagram showing an embodiment of a conventional printing and development apparatus. As seen from the figure, the apparatus generally consists of an exposure member 4, development member 5 and dryer member 6, and is such that, after the exposure, photographs are automatically developed and dried giving a finished photograph.

Photographic paper 7 is fed from a roll of paper by roller 8, and printing is done on sheets of the photographic paper that are cut from the roll with a cutter 9 located in front of the exposure station. These photographic sheets are secured on a perforated conveyor belt 10 that is stretched over the surface of the exposure station, by the suction produced in a suction chamber 11 located within the exposure station. Located in the exposure station 12, are a negative mask, an adjustable enlarging lens and a light source.

The conveyor mechanism in the exposure station is further explained. FIG. 3 is a perspective diagram showing an embodiment of the conveyor mechanism of a conventional printing and development apparatus. As seen from this figure, the photographic paper 7 wound as a roll and contained in "magazine" 14 is fed by the feed-roller 8 into the cutter 9, where the said photographic paper is cut into sheets. Guided by the guide entrance 15, the sheets are placed on the conveyor belt of the exposure station 13.

The belt 10 used for the conveyor has on its back surface ribs that mesh with gear teeth on internal rollers that make the belt move. Being sucked from within the exposure station through the pores on the conveyor belt 10, the photographic sheets are adhered to the conveyor belt. The belt conveyor stops at the appropriate exposure position, and after the exposure, the sheets are transported out of the exposure-area by the conveyor belt 10, passing though the exit guide 18. In this example, the driving force for the conveyor mechanism is obtained from motor 17, which transmits its motion to the roller through the belt 16.

Within the exposure station is a suction fan that, operated by a motor, creates an adhesive strength by expelling air through vent holes. The suction fan is fitted into the suction chamber. In the case when a trimming print is made using a conventional printing apparatus such as above, the exposure station and enlarging lens are kept stationary, and printing is done on a photographic paper, having magnified a part of the negative by moving the negative film. It is common for the negative film to be moved manually.

For printing to be done using a conventional printing apparatus, it is necessary that two out of the following three, the negative film, light-source and exposure station, mobile. As it is necessary to accommodate in the exposure station room for the movement of these mechanisms, the size of the apparatus will be that much larger. In addition, problems such as limitations on processing capabilities will arise because of the time required for adjustments. The present invention has therefore the objectives of realizing a printing apparatus that is smaller and that is equipped with a mechanism to speed up the processing.

In conventional printing apparatus, even though improvements on light intensity and performance of enlarging lens have been attempted, depending on the lens design, the lens surface can approach the film extraordinarily closer, and adjustments of the lens and handling of the negatives can thus become complicated. Particularly, in the case of printing of 3D photography where photographic papers containing lenticular lenses are used, the lens and the negative have to be moved relative to each other in a plane perpendicular to the light axis of the lens, and which can be complicating if the gap between the lens surface and the negative is very narrow. The present invention resolves the problem of the gap between lens surface and the negative becoming very narrow, and has the objective of presenting a printing apparatus, in which adjustment of lens and handling of negative films are easily performed.

In creating 3D photographs, shift in the center of exposure is usually obtained and rectified by observing the displacement in patterns on a focus chart, which has been printed onto a photographic paper. However, obtaining the displacement by observation is prone to errors and needs sidllfulness. High precision lens adjustment and correction require special skill, and are not simple operations. Therefore, 3D photographic printing has been a task that consumes time. In addition, it is difficult to create 3D photographs of assured quality. The present invention has the objective of presenting means of correcting the position of lens plate by having devised means of obtaining with certainty the shift in the center of exposure in the case of 3D photographic printing.

In the printing method by trimming, magnification factor is generally larger, and as a result, in the method where negative film is moved, a slight displacement of the negative causes a huge error at the exposure station. As the negative film is moved manually in the trimming method, besides the possibility of the negatives being marred by manual handling, precision adjustments are difficult and require skill. In order to move negative films using a displacement mechanism in place of the manual operations, a highly precise apparatus enabling slight movements is required, especially in the case of large magnification factors. In order to improve the operational performance, many printing apparatuses are equipped with feeding mechanisms to feed the negatives by fixed movements. In order to perform trimming, if a displacement mechanism provided for fine adjustments is used, the displacement mechanism will develop instabilities in accuracy, in addition to complications of the structure of printing apparatus. The present invention has the objective of presenting an efficient trimming method with the realization of a high precision displacement mechanism for trimming.

With regard to apparatuses, where continuous exposure and development take place as in conventional photographic print and development apparatuses, photographic papers are generally fed to the exposure station, having cut the said photographic papers being from a roll of photographic paper. In this method, though the photographic papers are cut by a cutter into predetermined lengths, the cut surface can have a residue of cut. Particularly when a photographic paper with a back coating is cut, a residue is easy to develop. Generally, the shearing conditions are varied by varying such factors as the cutting-edge angle, blade pressure and shearing speed, so that the residues are less easy to develop. As residues can not be completely eliminated however, waste forms from the edges containing residues when such photographs are conveyed inside the apparatus. In the case of 3D photographic papers containing lenticular lenses, this waste formation phenomenon is drastic.

If it happens that these wastes fall into the exposure station, not only shapes of the said wastes will be printed, sliding and rotary parts may receive damage. If it happens that wastes fall into the development processor, pumps and filters will be clogged, circulation of developer will become poor and the developer will degrade resulting in a shorter lifetime. If wastes are photographically processed, unevenness in development will occur, and problems like deterioration of print quality too will occur. The present invention thus has the objective of also preventing the origination of residues at the time of shearing of photographic papers, which is the cause of variety of shortcomings in automated print and development apparatuses.

SUMMARY OF THE INVENTION

In order that said objectives be realized, the printing means and apparatuses of the present invention are described in the following (1) to (5) disclosures in that order.

1) In the present invention, lens of the printing apparatus is made movable, and when printing is to take place, the said lens is positioned at the regular position of the lens, while in operations other than printing, the lens is evacuated to position far from the negative film to make lens protection and adjustments easier.

2) In the present invention, a sample-print detecting apparatus that consists of CCD cameras, line sensors and the like measures the shift in the center of exposure, and the correction required is automatically registered.

3) By rotating each of the components, the negative mask, lens and exposure station by the identical angle of rotation, it is possible to obtain in the present invention a predetermined angle of exposure. In addition, added to the motion by rotational mechanism, by minutely sliding the lens, printing of 3D photographs of a greater accuracy is made possible.

4) In the present invention, by incorporating means of displacement into the enlarging lens and exposure station, trimming printing is executed.

5) In the present invention, a photographic paper cut by the cutter is machined for removing wastes on the frontal region of the leading edge of the photographic paper by an edge-shaper that functions in the direction perpendicular to the progressing direction of photographic paper. The wastes removed are sent to a waste-box by a suction mechanism that is located at the leading end of the said edge shaper.

1) The lens displacement mechanism of the present invention is described as follows. FIG. 4 is a schematic diagram illustrating the operation of one embodiment of the lens displacement mechanism of the present invention. This figure illustrates one example of 3D photographic print and development apparatus. As multiple exposures is to take place, the enlarging lens 20 and photographic paper 21, are movable in the direction of light axis as well as in the XY direction that is perpendicular to the light axis.

When printing is to be performed, by moving the lens 20 as shown in the figure in the direction of light axis Z within the space between the photographic paper 21 and the negative film 19, the lens is brought to the regular lens position close to the negative film, and at desired magnification factor printing will take place; in operations other than printing, the said lens is evacuated from the position close to the negative so that adjustments on the negative film or the lens can be performed.

The embodiment of the lens displacement mechanism shown schematically in FIG. 4 is explained using more detailed diagrams. FIGS. 5 and 6 are diagrams illustrating one embodiment of the lens displacement mechanism of the present printing apparatus, FIG. 5 being the cross-section on the X direction while FIG. 6 being the cross-section on Y direction. In the displacement mechanism of the present inventive printing apparatus, stepping motor 22 is connected by nut 24 to the lens plate 25 through the ball screw 23, and, the lens can be moved up or down, together with the lens plate 25, on the slide ruler 26 that is secured to a wall or the like.

In FIGS. 4 to 6, which are given as an example of 3D photographic printing apparatus, the stepping motor 27 is connected by the nut 29 to the lens plate 30 5 through the ball screw 28, and the stepping motor 31 is connected by the nut 33 to the lens plate 34 through the ball screw 32. Because of that reason, the lens can be moved in the X direction together with lens plate 30 via the slide ruler 35 and in the Y direction together with lens plate 34 via the slide ruler 36. The stopping position in each direction is controlled by the angle of rotation resulting from the stepping motor pulse.

FIG. 7 shows the flow chart of the program that controls the lens displacement mechanism of the present inventive printing apparatus. With the lens displaced to the origin of the coordinate system as the initial setting, data require for photographic printing are read from memory. The lens is moved to standby position, and is brought to the exposure position when exposure is to takes place. Once the exposure is complete, the lens is moved back to the standby position.

FIG. 8 illustrates in a block diagram the features that are to be incorporated in one embodiment of lens displacement mechanism of the present inventive printing apparatus. The lens displacement mechanism is controlled by a computer that comprises: a ROM where the program represented by flow chart of FIG. 7 is incorporated, a CPU that executes the program, a RAM that becomes the main memory and an I/O port.

With signals coming from the I/O 10 port, X-axis control circuit, Y-axis control circuit and the Z-axis control circuit each moves the drivable members on X-axis, Y-axis and Z-axis respectively. With the drivable members, the enlarging lens is moved to the exposure position or to the standby position. In order that fine adjustments on the lens are made possible, high precision drive mechanisms such as pulse motors could be used.

2) The procedure for correcting the lens plate position in the present invention is described using diagrams. Considered here is the case of a 3-frame negative that undergoes 4 exposures. Although, it is possible to consider various types of patterns for focus charts, which are used for preparing sample prints, the desirable patens are those that are at the least arranged in the same pitch as the 3D photographic negatives and have a correspondence with the number of frames of the same negative.

When 4 exposures are to take place on a 3-frame negative, a focus chart of black-base is prepared, where three frames of images A, B and C are arranged in the same pitch as the 3D negative. Each of the focus charts A, B and C have in the central region patterns that are equal in size and shape, and for A, B and C to be distinguished from each other, it is preferable to include differences in the patterns in the peripheral region. Focus charts such as just described are photographed and a sample print prepared FIG. 9 shows the flow chart for preparing a sample print with regard to the present inventive means and apparatuses of photographic printing. As described in the flow chart, preparation of the sample print is such that firstly, the exposure position is obtained by adding a supplemental value to what is computed with reference to the focus chart that is located in the middle, and secondly, the other two charts are dually exposed. In order that the images of the dual-exposed focus charts be distinguished from each other, exposure is done having imposed the required correction. In the case of the sample print, it is preferable to print, allowing in advance a larger displacement. To realize that, exposure is done having imposed the value of correction.

FIGS. 10 to 13 show one example of preparation of a sample print with regard to the present inventive means and apparatuses of photographic printing. Considering as the example the case of a 3-frame negative undergoing 4-exposures, the figures show exposure positions when a sample print is being prepared by photographing focus charts. In this example, the focus charts of the three types, A, B and C correspond to the 3 frames of the negative.

As shown in FIG. 10, the focus charts 37 that have been arranged in the same pitch as the negatives, are inserted into the negative mask 38 and pictured onto a 2D photographic paper 40 positioned on the exposure station 39. The 2D photographic paper 40 placed in the exposure station 39 is exposed in the same manner as in the real 3D printing with the positions of the exposure station 39 and lens plate 41 changed. Focus charts are photographed in the following manner. In the state of FIG. 10, the focus chart A is photographed in the first exposure; in FIG. 11, the focus chart B is photographed in the second exposure; in FIG. 12, focus chart B is photographed in the third exposure; in FIG. 13, the focus chart C is photographed in the fourth exposure.

In order to prepare a sample print, several combinations of multiple exposures can be considered, and in the given example the sample prints are prepared by the following combinations of dual exposures: the first and second exposures (corresponding to the A and B focus charts), the second and fourth exposure (B and C focus charts), the second and third exposure (B and B focus charts). In the exposures, the middle focus chart in the row of focus charts is taken to be the bench mark. The obtained three sample prints are the superimposed mismatched prints of each of the two focus charts A and B, B and C, and B and B.

Henceforth, with reference to diagrams, the procedure is described for rectifying the exposure position using the sample prints prepared as described above. FIGS. 14 to 16 are the diagrams showing the procedure for rectifying the exposure position using the sample prints with regard to the present inventive means and apparatuses of photographic printing. As shown in FIG. 14, the central region of the sample print 42 is filmed with a video camera 43 and projected onto a monitoring display 45, as shown in FIG. 15, centering the cross-marks on the central region of the focus charts in the sample print.

Next, using a cursor controlling device 46 such as a trackball, the cursor 47 on the display 45 as shown in FIG. 16 is moved, and a key-subject point is specified at the point of intersection of the cursor with the cross mark 44, which is displayed with a mismatch.

Correction required on the lens position is computed and registered by a computer from the centers of each focus chart of the sample prints that are displayed on the monitor by the video camera for the purpose of confirming the central position. FIG. 17 is a flow chart showing the correction process of lens position with regard to the present inventive method and apparatuses of photographic printing.

In the present example of three-frame negative undergoing four-exposures, it is preferable to choose as the central bench mark the image of the focus chart B of the second exposure. The CPU determines the X-Y coordinates of a specified point, calculates the amount of mismatch of the exposure center and evaluates and registers the correction needed. With regard to the other sample prints too, the above procedure is repeated and the correction is calculated and registered. While the video camera exclusively for filming the sample prints may be installed, it is also possible to make use of the video camera detecting negatives installed in the printing apparatus. In that event, the sample prints have to be inserted in the negative mask in the same manner as normal negatives.

In the above example, although measurements of the sample print was done manually, instead of performing cursor control, it is possible by incorporating an image recognition device in the image processing section to automate the measurement of the key-subject point coordinates, computation and registration of the amount of correction and printing.

3) FIG. 18 is a diagram explaining the principle behind the 3D photographic printing device of the present invention. The figure shows the manner in which each of the components, the negative mask 51, lens 49 and exposure station 50 and the like are independently rotated. Providing each of the components, the negative mask 51, lens 49 and exposure station 50 with a rotational mechanism, it is possible to rotate the negative film, the photographic paper containing lenticular lenses and the enlarging lens each by a desired angle of rotation. In doing the above manipulations, it is possible to tilt the light rays of exposure falling onto to the lenticular photosensitive material, with the light axis fixed.

FIG. 19 is a schematic diagram showing rotational mechanism of the printing apparatus of the present invention. Each of the components, negative mask 51, lens 49 and exposure station 50 rotate around independent points of support. The component of lens 49, in addition to having rotation movement, can be moved in either X or Y direction by a slid mechanism, depending on the need.

In relation to rotational exposure, operations from light source to exposure station are explained in detail. FIG. 20 shows a diagram explaining the operations of photographic printing apparatus of the present invention. The components, negative mask 51, lens 49 and the exposure station 50 are each not rotated, and are in the state of being laid on a straight line. In this state, the apparatus can be used as an enlargement print-device of conventional photographs, not as of 3D photographs. In an exposure device such as the one described, the case of four exposures occurring is described. FIGS. 21 to 24 are the diagrams explaining one example of operations of printing apparatus of the present invention and respectively show the exposures from the first to the fourth exposure.

FIG. 21 shows the diagram for the first exposure. The film 52 is inserted into the negative mask 51. Film 52 shows the state of the film viewed from the top, and in reality, only the thickness can be seen viewed from sides. By rotational and translational motion of the lens, all three of the components, negative mask 51, lens 49 and exposure station 50 are rotated to a right-side-inclined position, and the first exposure operation takes place.

The negative mask 51, exposure station 50 and lens 49 are each tilted by the same angle, and the surfaces of the negative, lens and the photographic paper will become parallel as a result of the angle of rotation being identical. By performing these operations alone however, the relative positions of negative mask 51, exposure station 50 and lens 49 will be slightly different from those in exposure methods due to conventional parallel translational motion. Printing would be possible even under this condition, and where a higher accuracy is needed the lens 49 is to be slid.

FIG. 22 shows the diagram for the second exposure. Image for the second exposure is either automatically or manually set. By means of rotational and sliding motion, the three components, negative mask 51, lens 49 and exposure station 50 are rotated to a right-inclined position that is less inclined than in the first exposure, and the second exposure is executed. FIGS. 23 and 24 are the diagrams showing respectively the third and fourth exposures, and they are in symmetric positions with regard to exposure and the light axis. FIG. 25 illustrates an enlarged diagram showing rotational motion of the negative mask and rotational and translational motion of the lens of the photographic printing apparatus of the present invention.

(4) An outline is given of the position adjustment mechanism that is used in the trimming method of the printing apparatus of present invention. As one embodiment of the position adjustment mechanism in the trimming method of the present inventive printing apparatus, it is possible to utilize the mechanism of FIG. 4 used for lens movement in XY-directions and for controlling photographic paper position. With the negative film secured, trimming of desired nature can be performed by changing the positions of the enlarging lens or the photographic paper. In the embodiment, position control of enlarging lens and photographic paper will be performed as indicated by the arrows in FIG. 4 in X-Y directions.

While specification of trimming position is possible by observation, in the embodiment, trimming position is determined by observing on a television monitor the image of the negative film captured by a television camera. Given a computer system that is capable of performing cursor control, it is possible in the embodiment to specify the trimming position by such means as a cursor with respect to the image of the film on a television monitor.

In this case, from the position the cursor has defined, the computer calculates the positions of the exposure station and the enlarging lens and makes it possible for settings to be made automatically. Film-holding device is adequate to be equipped with a mechanism, which only holds or feeds the film by a fixed amount.

Below is a description of an embodiment of the position adjustment mechanism that is used in the printing method where trimming of present invention takes place. FIGS. 26 and 27 illustrate an embodiment of the position adjustment mechanism for the enlarging lens of the present inventive printing apparatus, where FIGS. 26 and 27 respectively being the cross-sections on the X direction and Y direction.

While the stepping motor 62 is secured by nut 60 to the bottom lens plate 57 via the ball screw 61, the stepping motor 55 is secured to the top lens plate 56 by the nut 54. The bottom lens plate 57 is supported by the slide-rails 58 on a setting plate, and the top lens plate 56 is supported by the slide-rails 59.

As shown by arrows in FIG. 26, the enlarging lens 53 can be moved together with the top lens plate 56 in X direction by the stepping motor 55. Stopping positions of each of the lens plates are controlled by the angle of rotation resulting from stepping motor pulse.

The trimming method of present inventive printing apparatus is further specifically explained. FIGS. 28 to 30 are the diagrams explaining the procedure of the trimming method of the present inventive printing apparatus. As in FIG. 28, the negative film 63 is loaded onto the negative film mask 64, and a television camera captures the image on the negative film and displays the same, as shown in FIG. 29, on a television monitor 67. In the image processing section, which controls the television monitor, a cursor control device 66 is incorporated and through console 68, numerical input can be made. As shown by the dashed-lines in FIG. 30, specification of trimming is made by the cursor 65. In this case, when the two points, P1 and P2 that are the top left and bottom right corner points of the desired trimming-area are specified by cursor on the monitor, the trimming frame is inputted and displayed. The locations of the two points P1 and P2 specified by the cursor are read into the computer from the image on the television monitor, and the distances X and Y determined, whereby the printing dimensions and magnification factor are computed giving priority to the larger of the ratio between X and Y that exceeds the ratio of length to breadth of paper.

Additionally, the center of the trimming image is computed from the positions of the two points, P1 and P2, and then the adjustments needed on the lens plate and exposure station are calculated for the said center and the centers of the lens and photographic paper to lie roughly on a single line. In accordance with these computed values of adjustments, the lens plate and exposure station are moved to their proper positions, and thereof, trimming of the desired region is possible to be printed.

(5) When photographic paper is sent to exposure-processing section, having cut the same from a roll of photographic paper by a cutter, wastes on the frontal region of the leading-end cut-surface of the photographic paper is machined by a mechanism incorporated in the present inventive print and development apparatus, wherein an edge-shaper is actuated in the direction perpendicular to the progressing direction of photographic paper. The wastes removed are sent to a waste-box by a suction mechanism that is located at the leading-end of said edge shaper.

Operation of the present inventive print and development apparatus is explained based on illustrations. FIG. 31 shows the sectional view of one embodiment of exposure section of the present inventive print and development apparatus. A mobile blade 72 is located just behind the cutter 73. The mobile blade 72 moves reciprocately in the direction perpendicular to the progressing direction of the photographic paper 71. When the apparatus is operated, the photograph that is to become the object for machining starts moving in the direction of arrow.

Once the leading edge of the photographic paper 71 is machined being pressed by the mobile blade guide 72, the photographic paper, progressing along the guide moves onto the top surface of the suction box 69. Located within the casing of the exposure station, the suction box 69 has on its top surface many perforations for the purpose of adhering said photographic paper. When a photographic paper is sent onto said top surface, a suction fan 70 starts expelling air out of the suction box and sucking air through said perforations adhering said photographic paper in just enough strength not letting the same lift while maintaining the surface flatness.

In the exposure section, having been adhered to the conveyor belt 74, the cut photographic paper is exposed with the surface flatness maintained. After the exposure, the photographic paper is conveyed by conveyor rollers to development processing section not shown in the figure.

FIG. 32 is a diagram showing one embodiment of the cutting device of the present inventive print and development apparatus and represents the state in which a residue of cut in the cut-section of a photographic paper is being removed. When the leading edge of the photographic paper 71 comes in contact with the mobile blade 72 in the path of the blade, which reciprocates at right angle to the direction in which the photograph moves, said leading edge is cut by the mobile blade 72. The mobile blade returns to the starting point of the same so as not to cut the leading edge of the photographic paper. The mobile blade 72 is moved to the cut-end of the photographic paper in the direction perpendicular to the progressing direction of the photographic paper and the part with a residue of cut is removed. After the removal of the residue of cut, the mobile blade is moved away from the photographic paper and is returned to the original position, completing a sequence of operation.

FIG. 33 shows a diagram for explaining the cutting of a photographic paper based on the embodiment of the cutting device of the present inventive print and development apparatus, and shown in FIG. 34, which is an enlarged diagram of FIG. 33 is the state of the photographic paper being cut. The photographic paper is cut by the mobile blade in a state in which the photographic paper is bent upward being pressed by the mobile blade from the side of the back-coating of the photograph. FIG. 35 shows a diagram for explaining the state of the cut of the photographic paper by the cutting device of the present inventive print and development apparatus. The figure shows that the leading edge of the photographic paper has a residue of cut on the back coating after the photographic paper has been cut by the cutter. The finished state of the cut is the state, in which the photographic paper has been cut by the mobile blade at the edge where the photographic paper contains the residue of cut of the back coating 75 removing the said residue of cut 76 on the back coating together with a part of the back coating.

Providing the present inventive printing apparatus with the said lens-displacement mechanism, it is possible, besides peripheral devices being arbitrarily organized independent of the gap between the lens and negative film, to simplify maintenance, changing of the enlarging lens or the like for the reason that the lens can be handled having the same retreated from the negative film. Similarly, when the present inventive lens displacement mechanism is utilized in 3D photographic printing apparatus, it is possible to realize a printing apparatus with the capability to move the lens in a plane normal to the lens light axis because of the resulting elimination of interferences between the peripheral devices.

By means of the present inventive methods and apparatuses of 3D photographic printing, said lens plate position can be automatically corrected, and precision positions adjustments do not require trained personnel. Additionally, as a consequence of measurements on the shift in exposure center by means of cursor controlling and computerizing, obtaining an accurate exposure-position is made possible by computation, and 3D photographs of established quality can be made with simplicity because the need for the skills of a trained personnel does not exists.

According to the present inventive printing apparatus, each of the components, negative mask, lens and exposure station have only rotational movement while the exposure light axis is stationary, and hence the apparatus size can be restricted to accommodating the largest print size, the result of which being compaction of the apparatus. Additionally, as rotation can be performed much rapidly than parallel displacement in each component, the overall exposure time can be reduced.

According to the present inventive printing apparatus, because an enlarged image on a display is used instead of a negative film image for position controlling, it is possible to define a trimming position with simplicity and to perform trimming without the need for having to move the negative film manually, whereby eliminating the concern of smearing the negative film by manual handling. In addition, since the lens can be moved together with the exposure station, distortions in projected images can be restricted to the least extent.

According to the present inventive printing apparatus, admittance of cutting wastes into exposure and development processes are stopped and uniformity of the quality of finished photographs can always be maintained. Particularly, excellent exposure and development processing can be performed even in the case of 3D photographic papers consisting of lenticular sheets, where the photographic papers are thick and wastes are easy to develop from cutting.

DETAILED DESCRIPTION OF THE PREFERRED EMBODIMENTS

Figure 1:
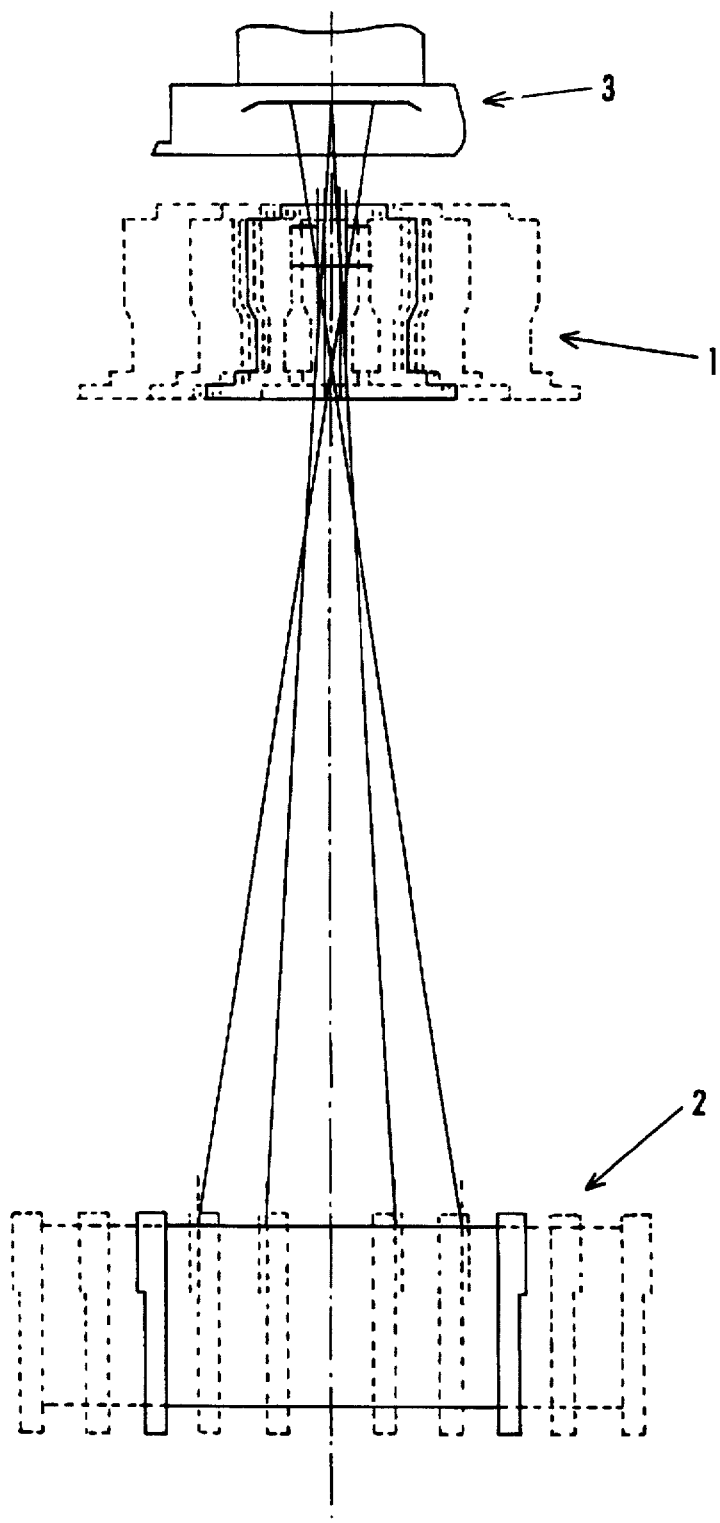
FIG. 1 shows a diagram of a convention 3D photographic printing apparatus using the "indirect method".
Figure 2:
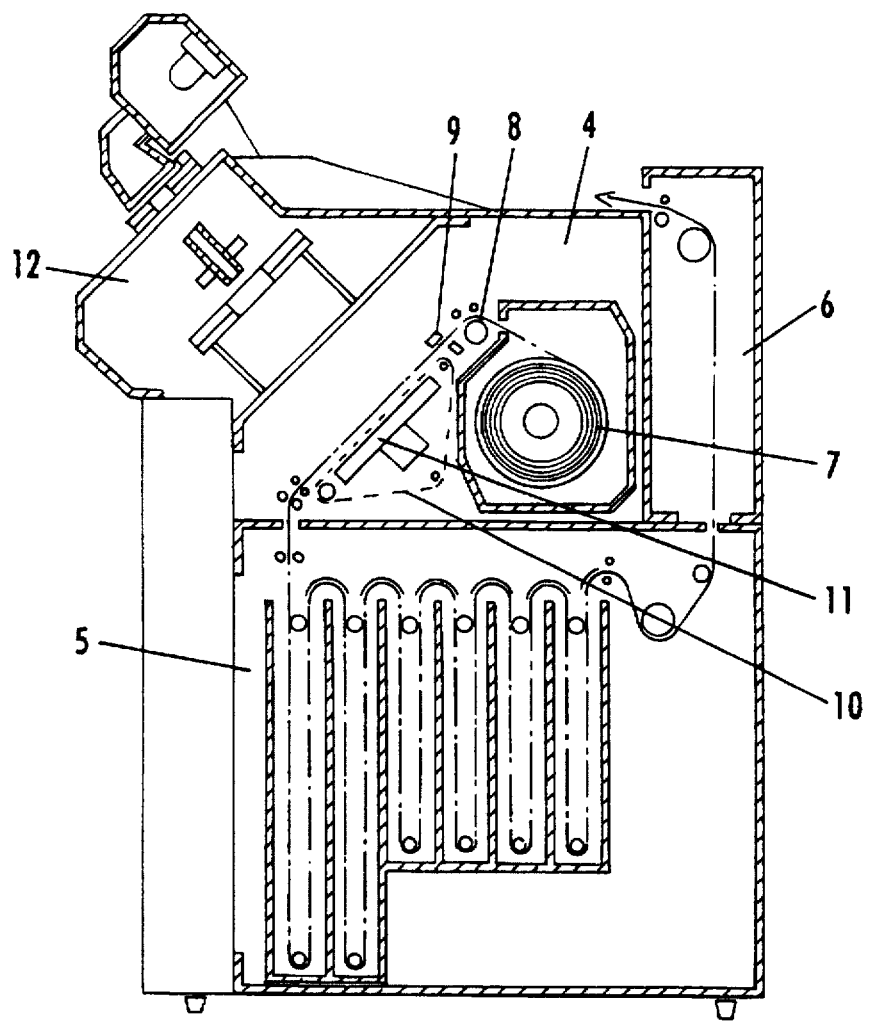
FIG. 2 shows a schematic diagram showing one embodiment of conventional photographic printing apparatus.
Figure 3:
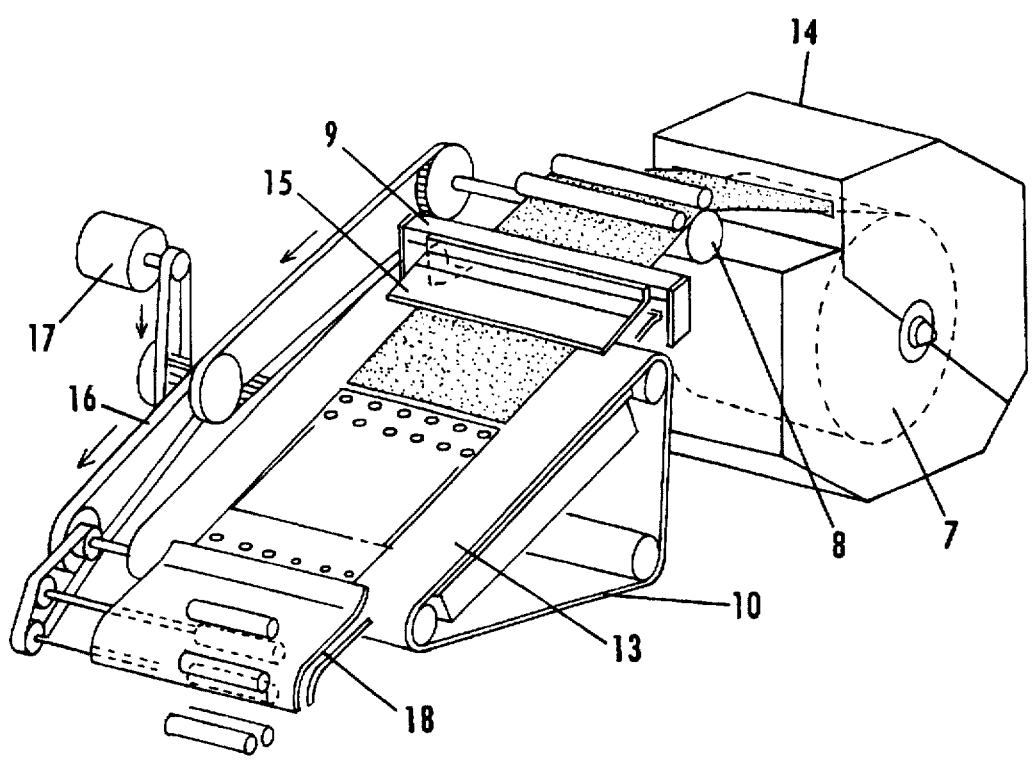
FIG. 3 is a perspective diagram showing one embodiment of conveying mechanism of conventional photographic printing apparatus.
Figure 4:
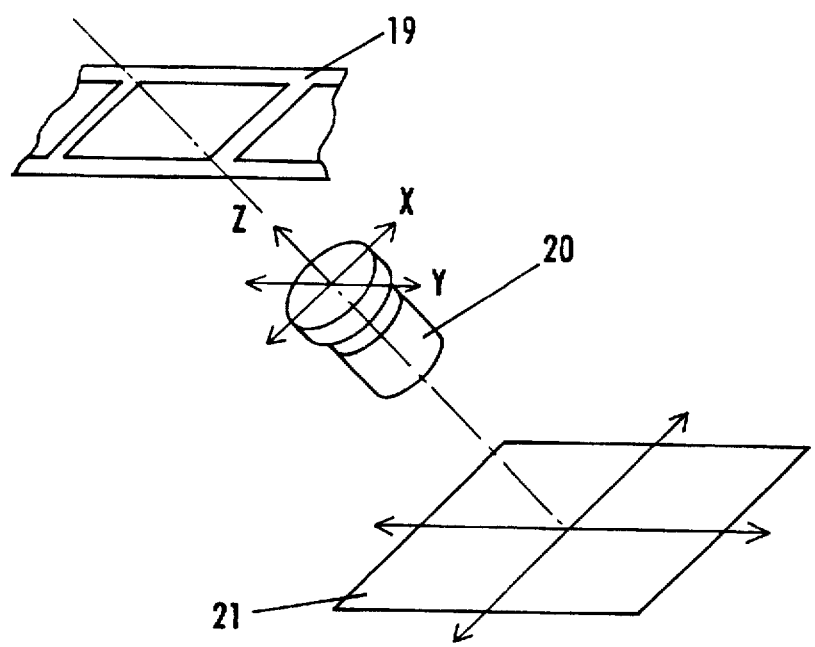
FIG. 4 shows a schematic diagram illustrating operations of one embodiment of the displacement mechanism of the present inventive printing apparatus.
Figure 5:
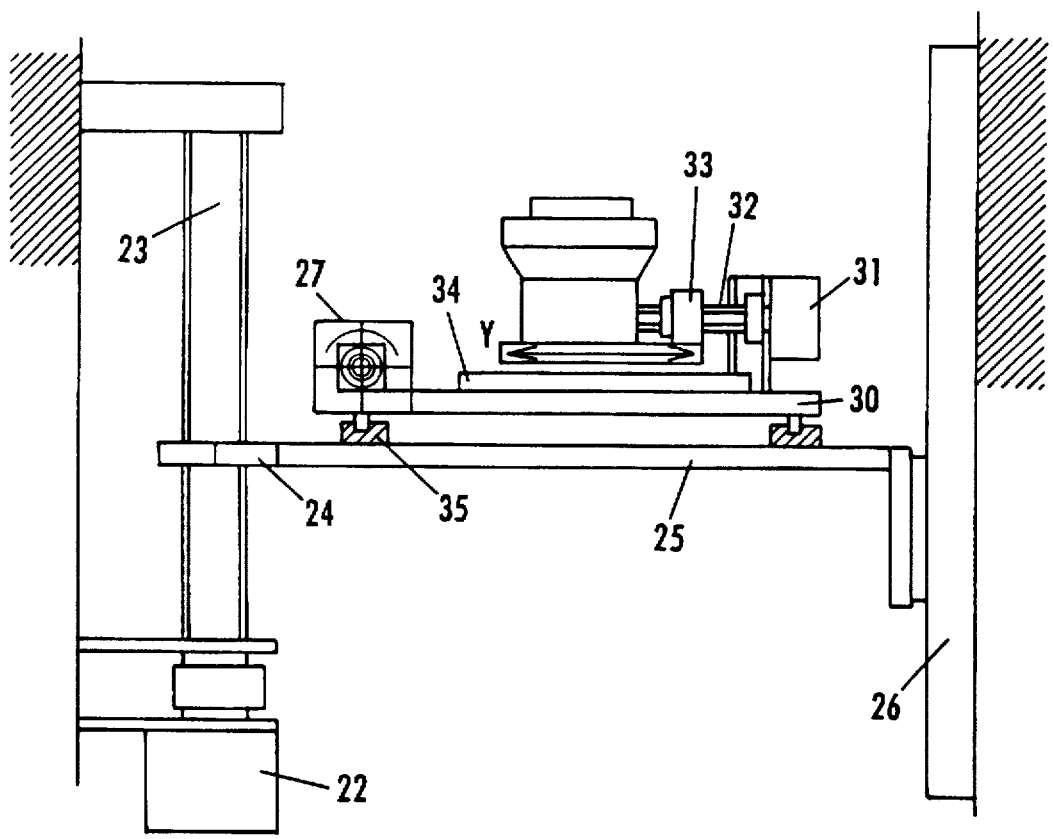
FIG. 5 is a diagram on the cross-section on X-direction illustrating one embodiment of the lens displacement mechanism of the present inventive printing apparatus.
Figure 6:
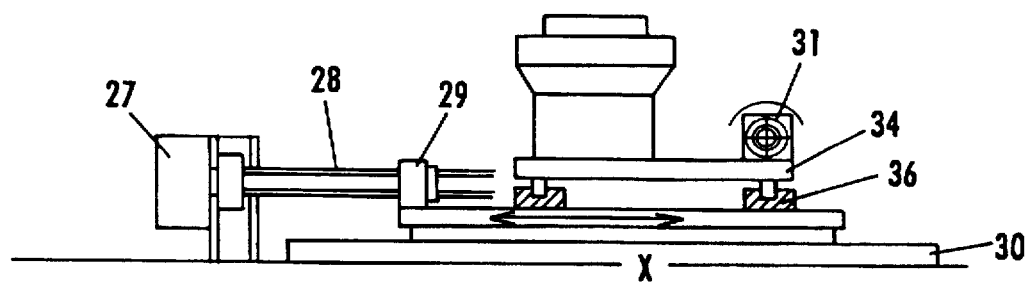
FIG. 6 is a diagram on the cross-section on Y-direction illustrating one embodiment of the lens displacement mechanism of the present inventive printing apparatus.
Figure 7:
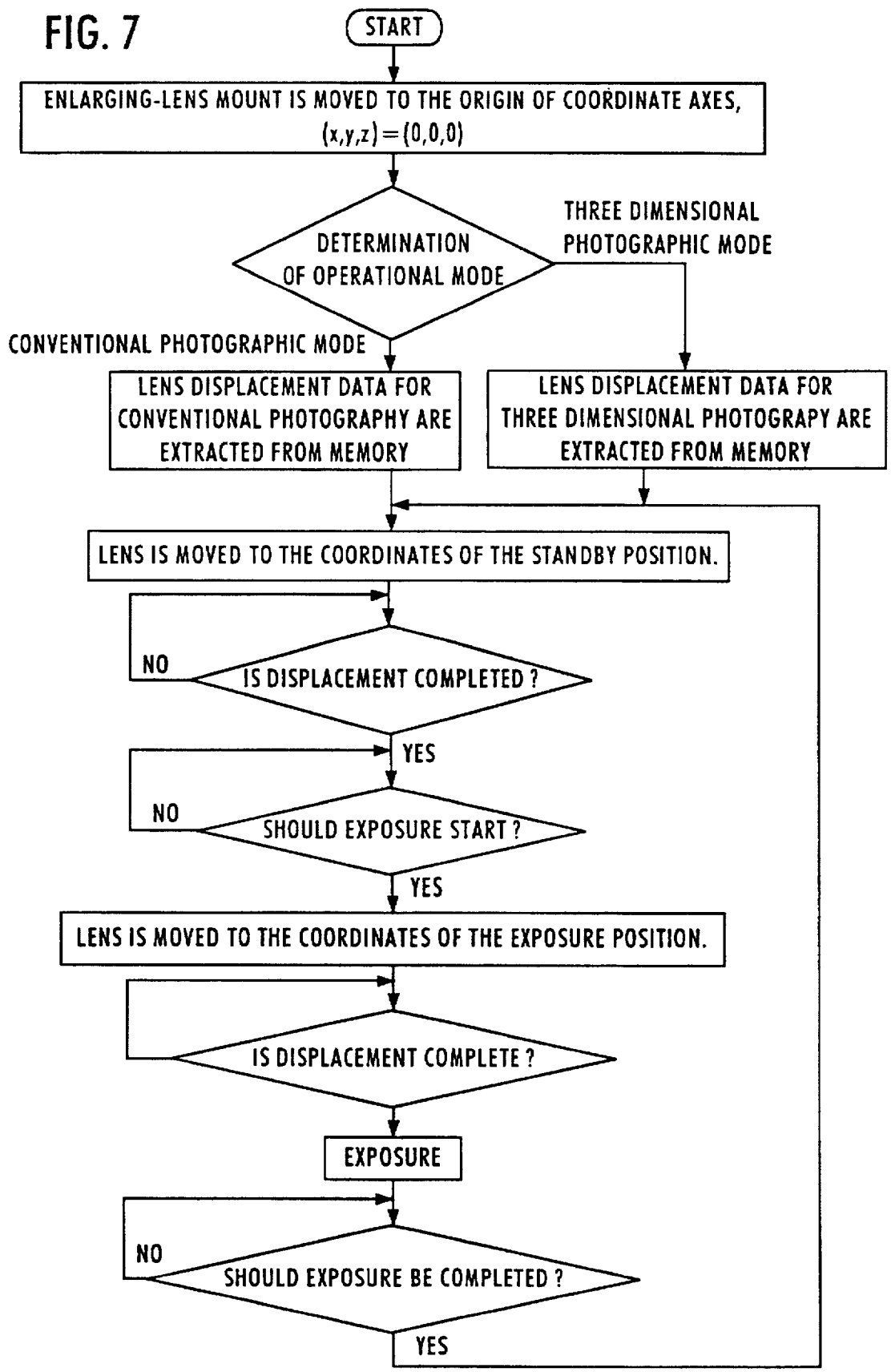
FIG. 7 shows the flow chart of the program that controls the lens displacement mechanism of the present inventive printing apparatus.
Figure 8:
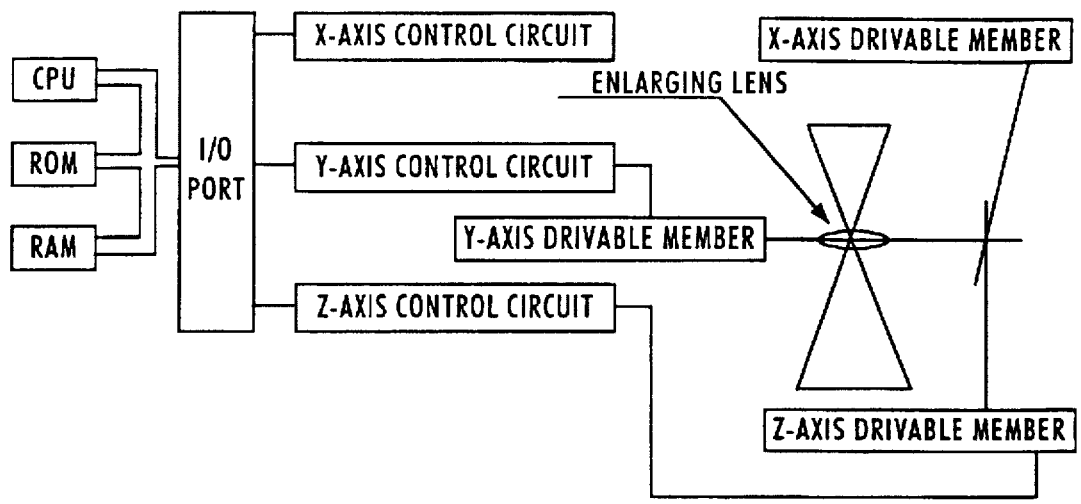
FIG. 8 illustrates in a block diagram the features that are to be incorporated in one embodiment of lens displacement mechanism of the present inventive printing apparatus.
Figure 9:
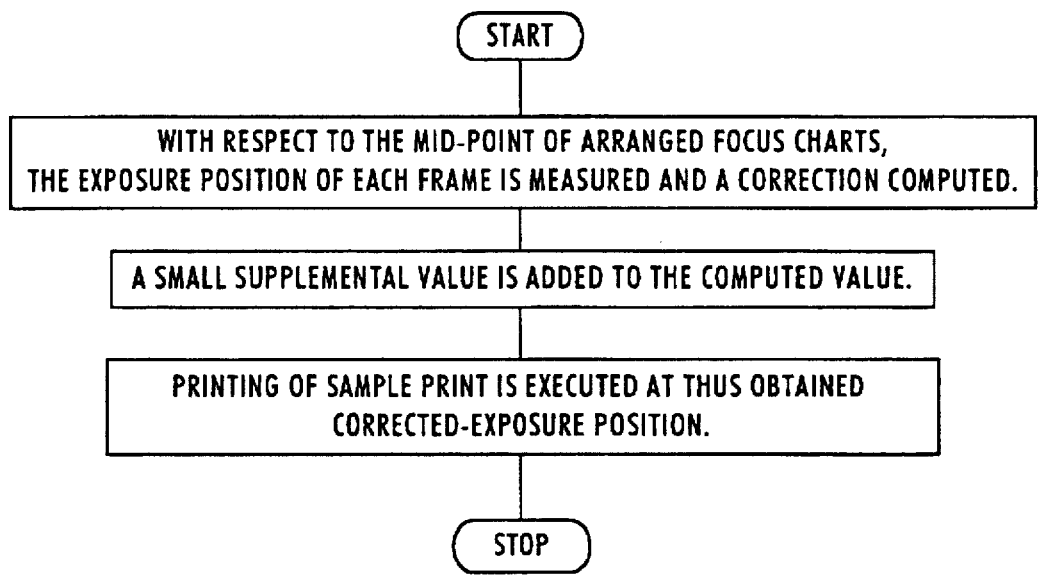
FIG. 9 shows the flow chart for preparation of a sample print with regard to the present inventive means and apparatuses of photographic printing.
Figure 10:
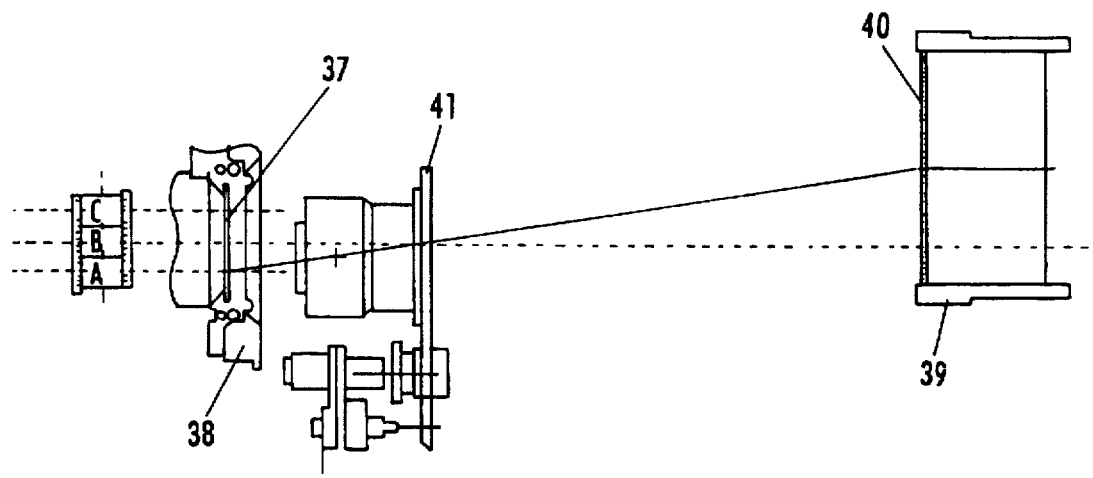
FIGS. 10–13 illustrate one embodiment for preparation of a sample print with regard to the present inventive means and apparatuses of photographic printing.
Figure 11:
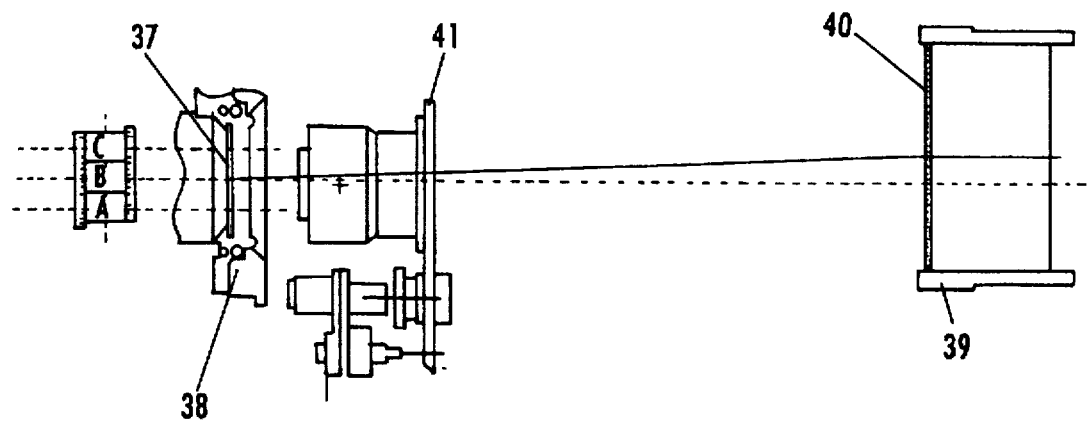
Figure 12:
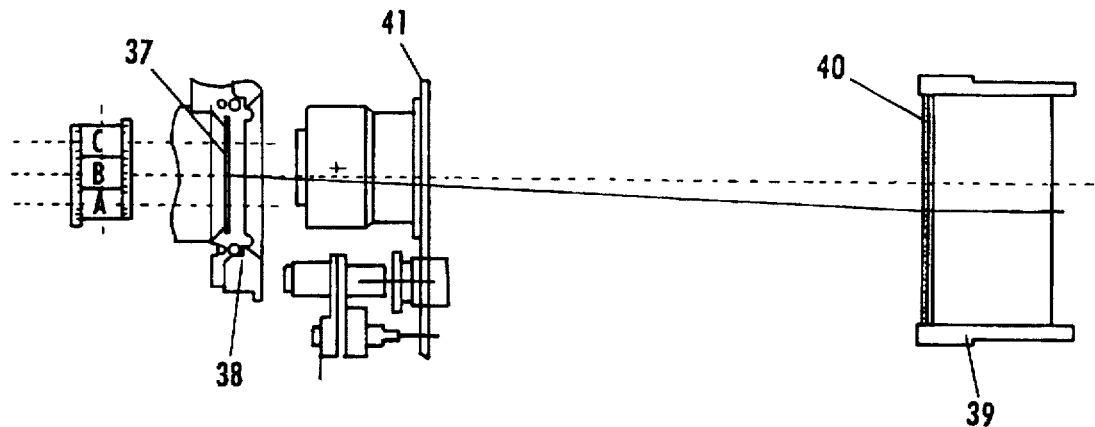
Figure 13:
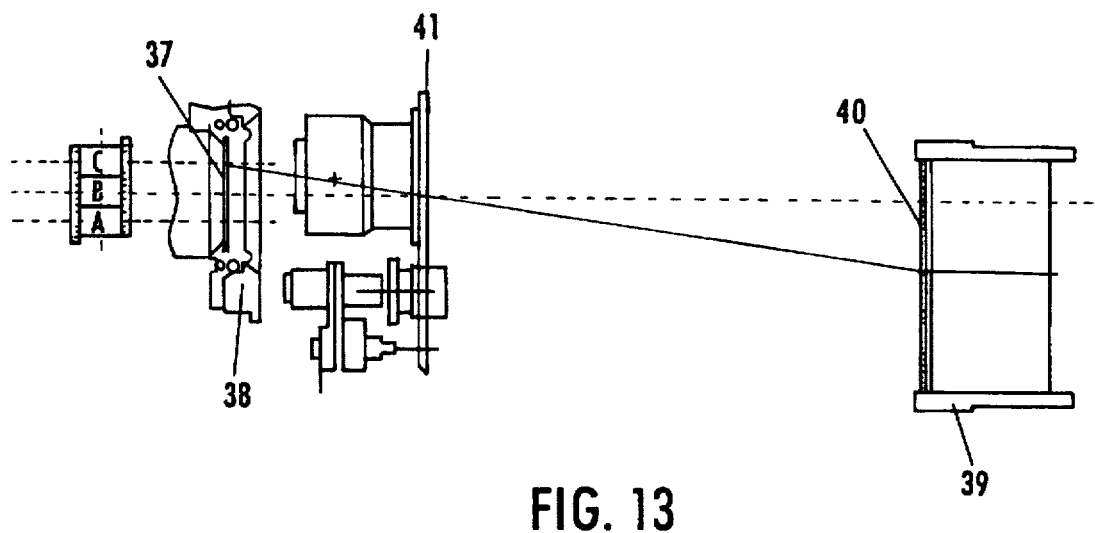
Figure 14:
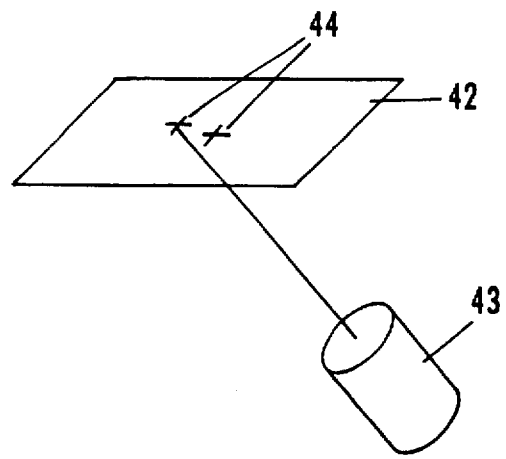
FIGS. 14–16 are the diagrams illustrating the procedure for rectifying the exposure position using sample prints with regard to the present inventive means and apparatuses of photographic printing.
Figure 15:
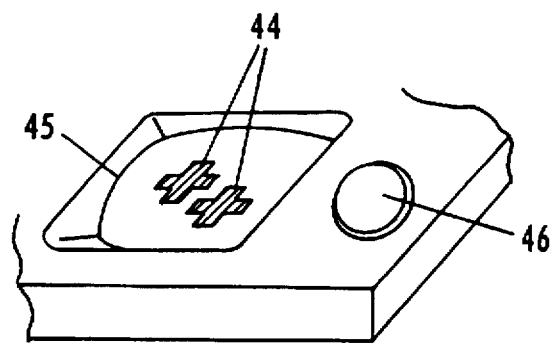
Figure 16:
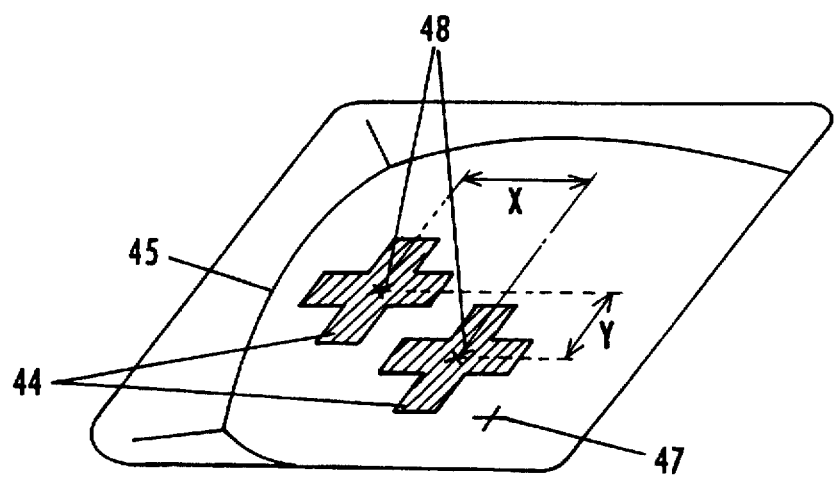
Figure 17:
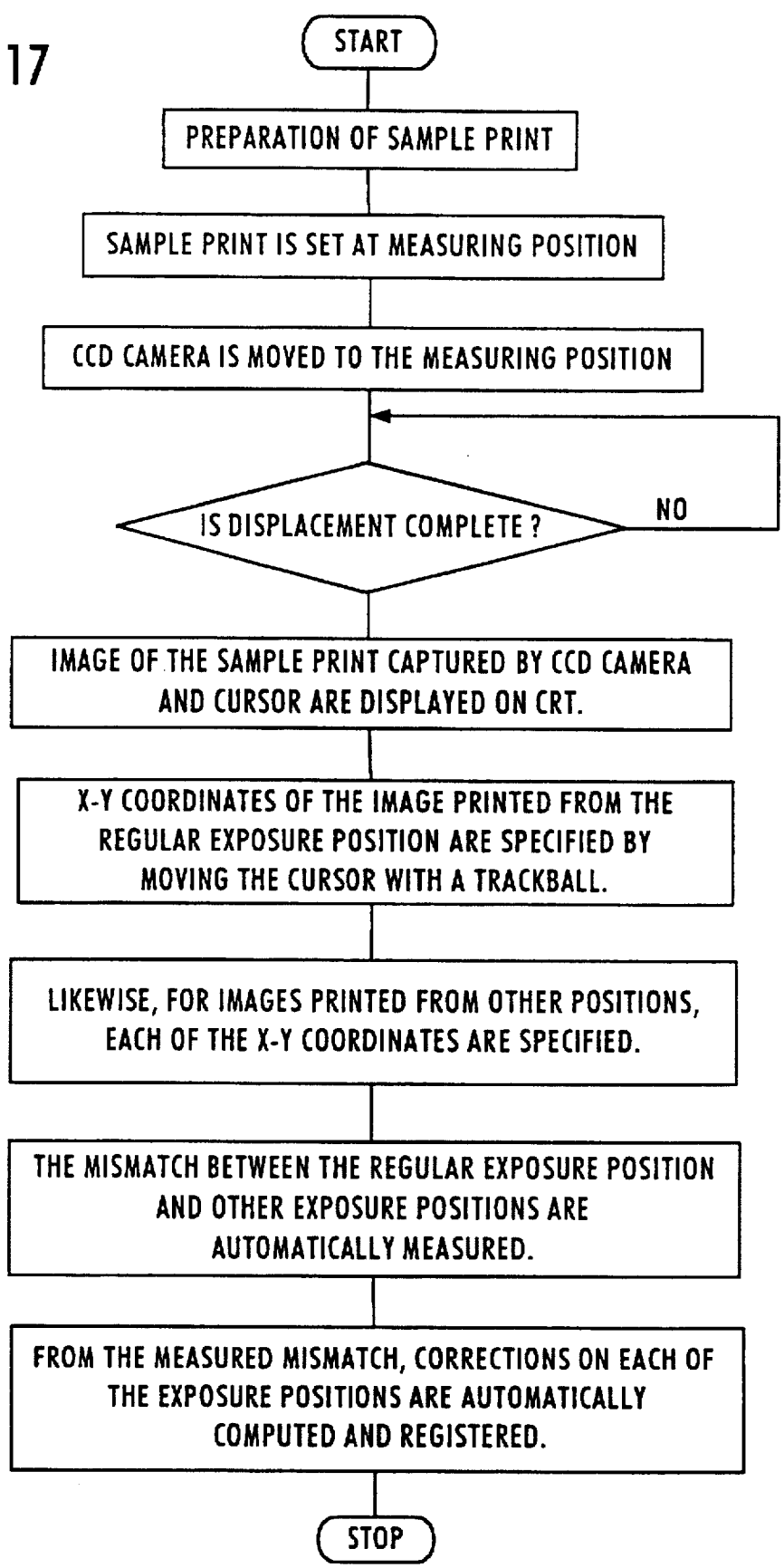
FIG. 17 is a flow chart showing the procedure for rectifying exposure position with regard to the present inventive method and apparatuses for photographic printing.
Figure 18:
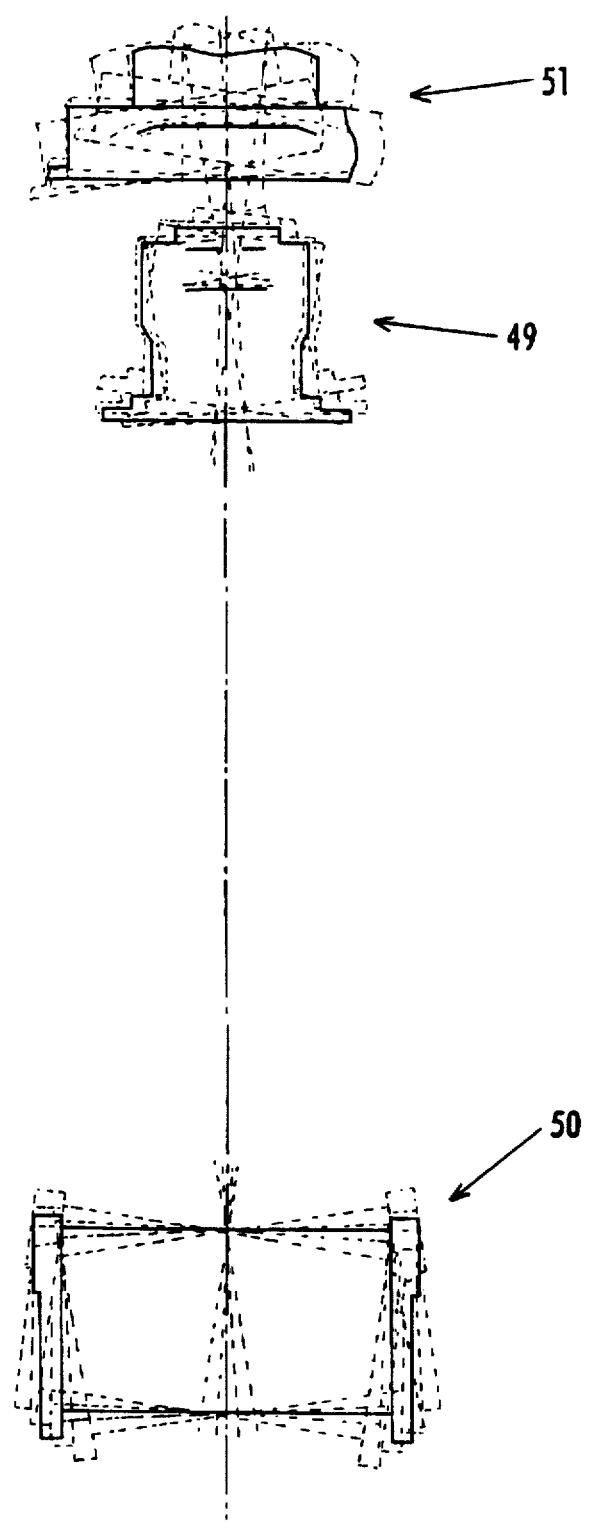
FIG. 18 is a diagram explaining the principle behind the 3D photographic printing device of the present invention.
Figure 19:
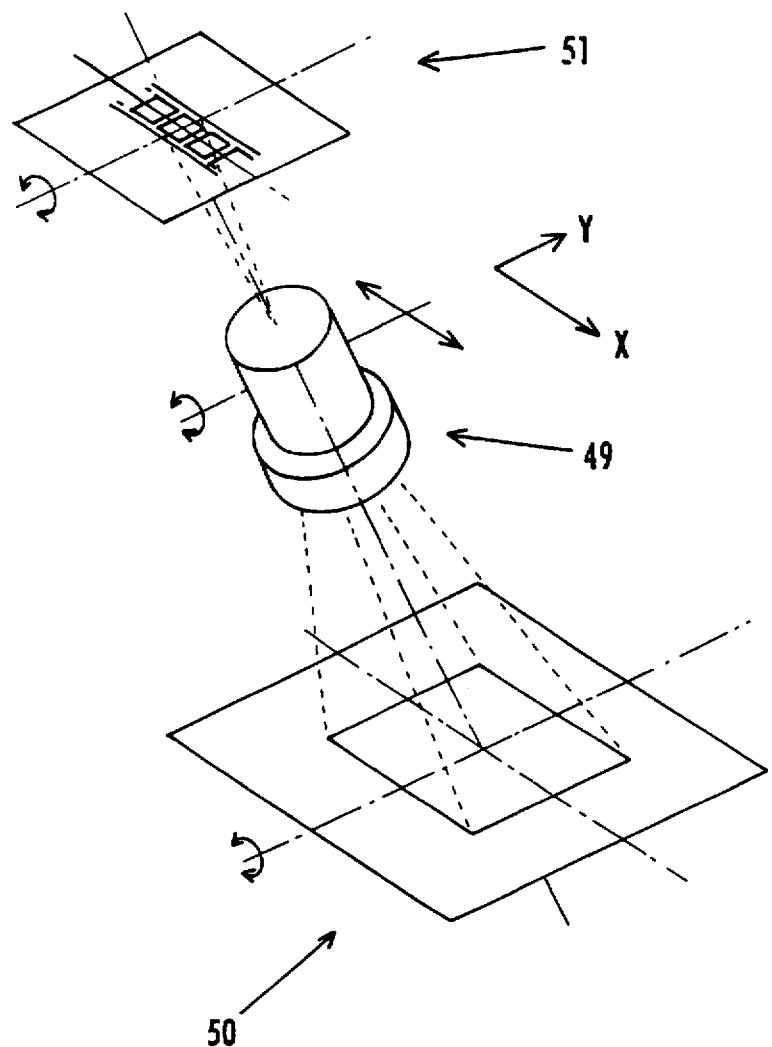
FIG. 19 is a schematic diagram showing rotational mechanism of the printing apparatus of the present invention.
Figure 20:
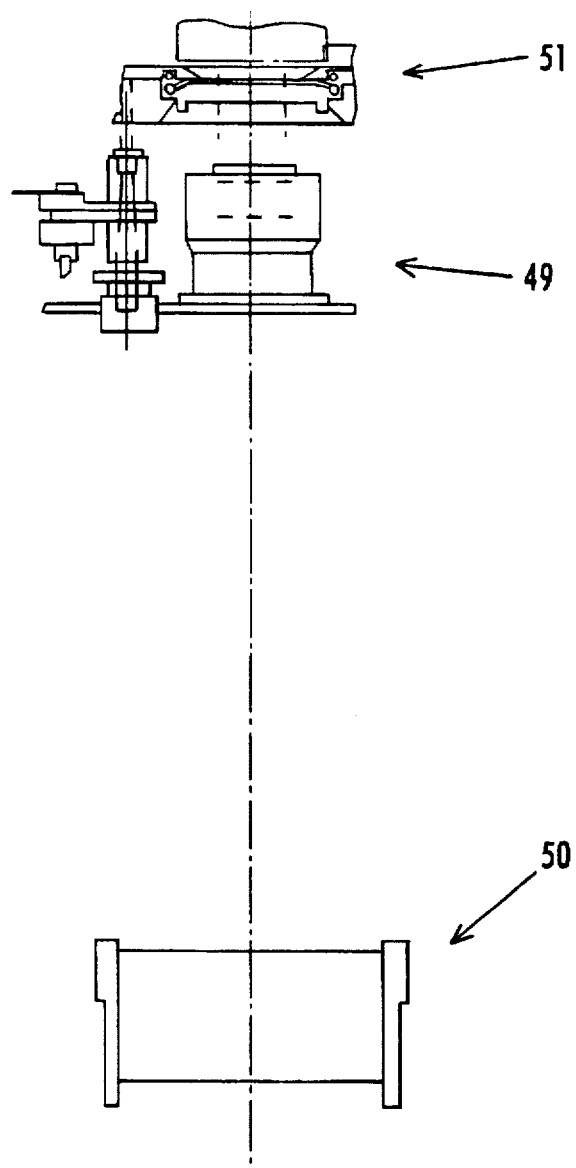
FIG. 20 shows a diagram explaining the operations of photographic printing apparatus of the present invention.
Figure 21:
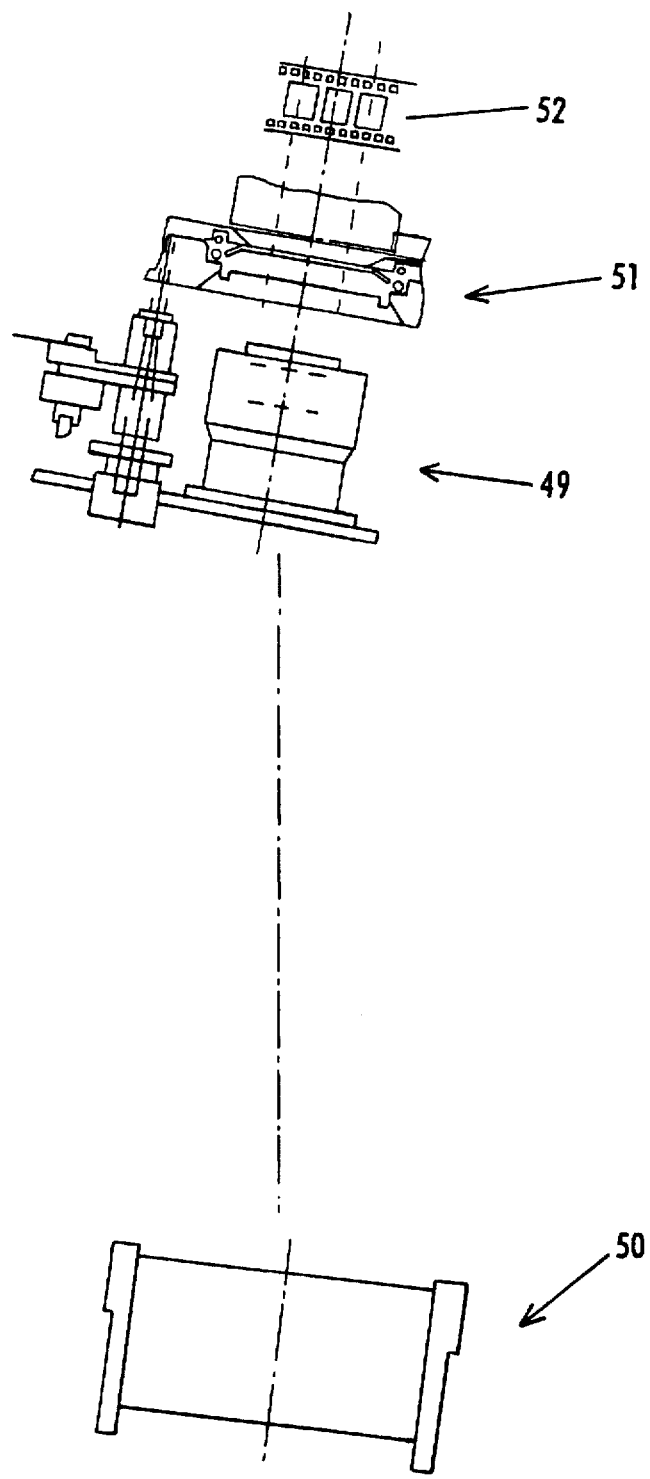
FIGS. 21–24 are diagrams explaining operations of one embodiment of the photographic printing apparatus of the present invention.
Figure 22:
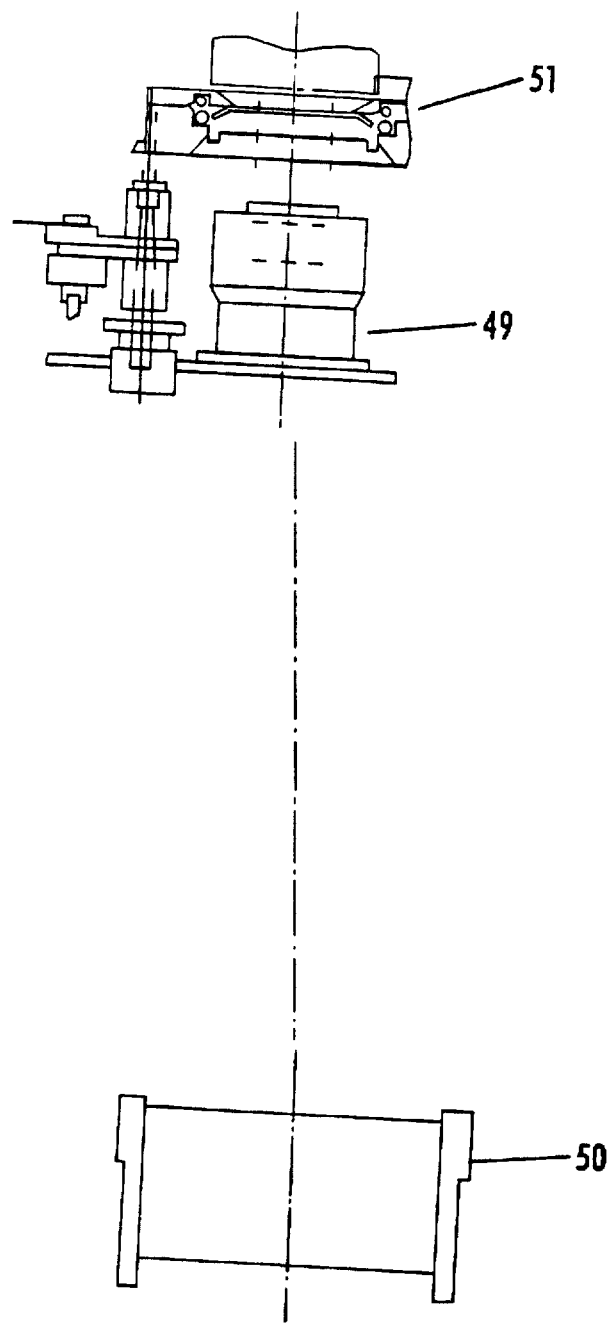
Figure 23:
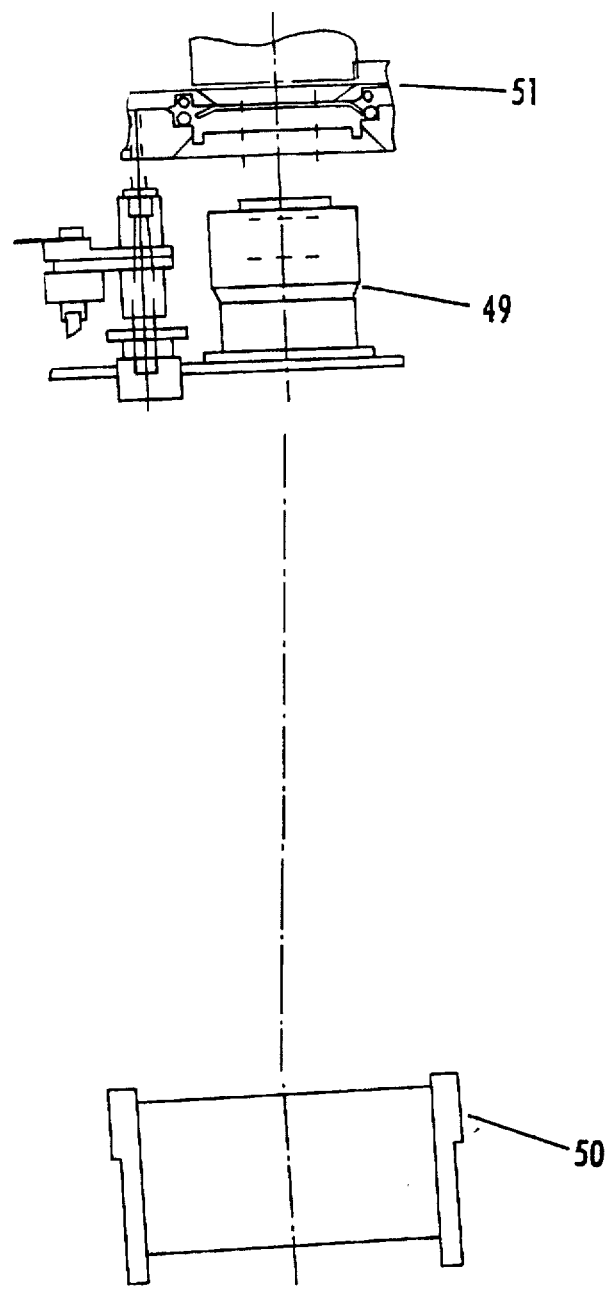
Figure 24:
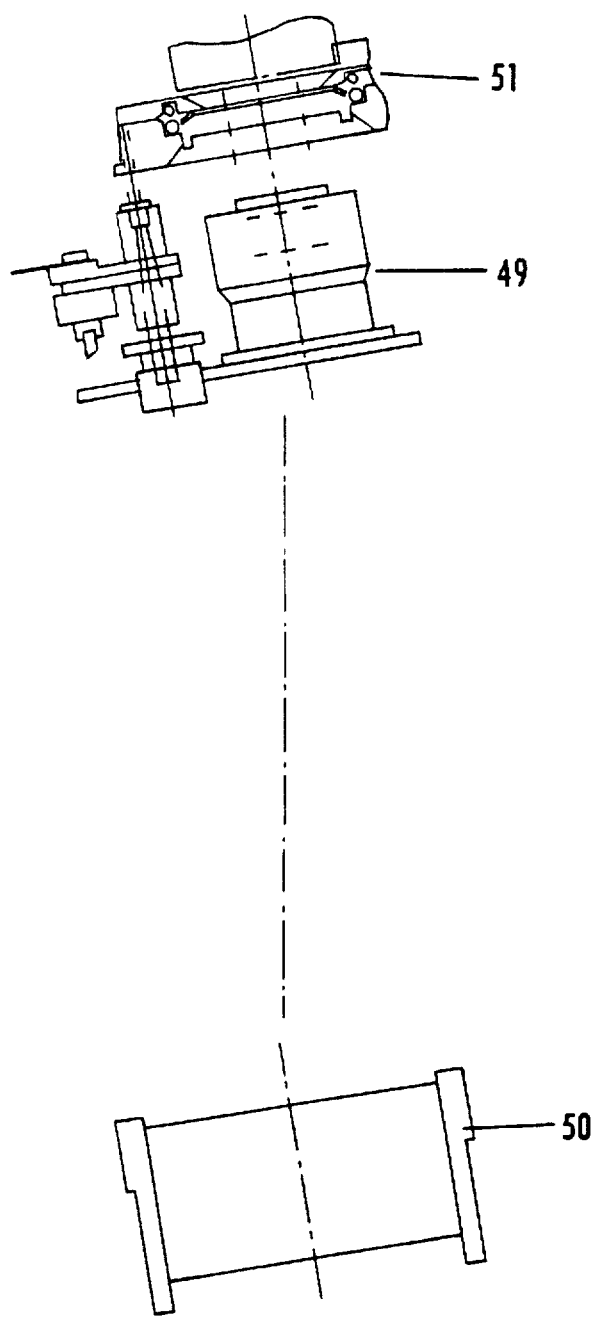
Figure 25:
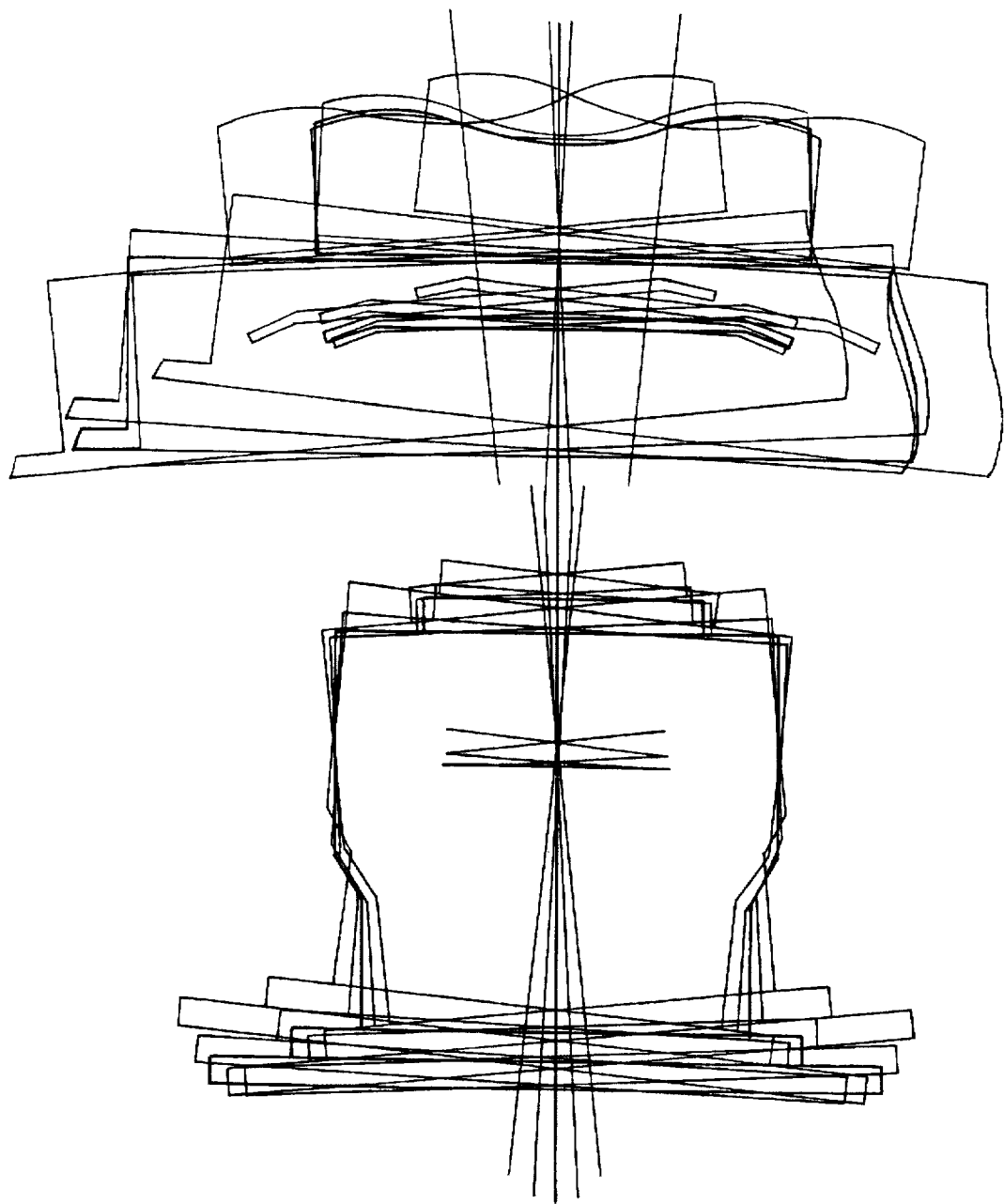
FIG. 25 shows an enlarged diagram illustrating rotational motion of the negative mask and rotational and transnational motion of the lens of the photographic printing apparatus of the present invention.
Figure 26:
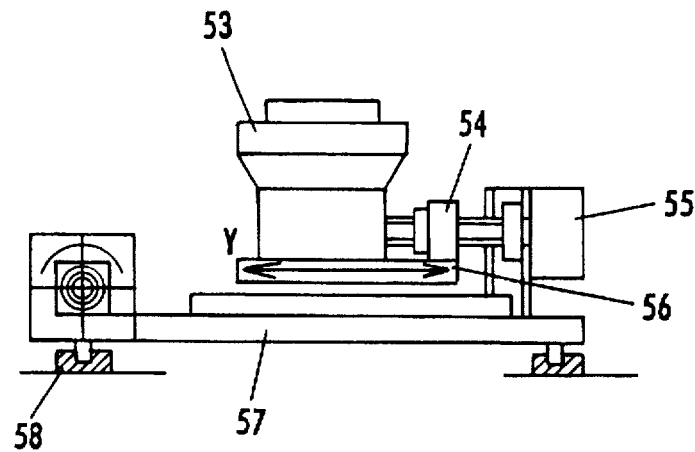
FIGS. 26–27 illustrate sectional views of an embodiment of the position adjustment mechanism for the enlarging lens of the present inventive printing apparatus.
Figure 27:
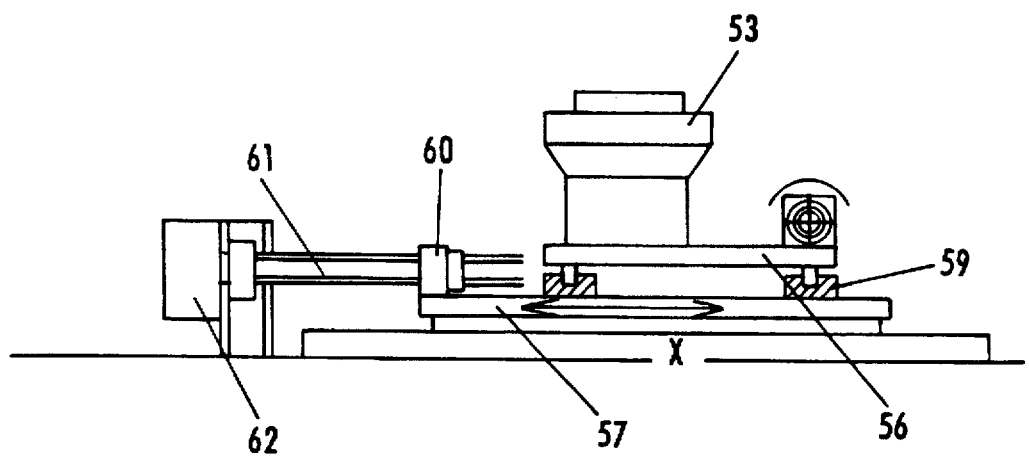
Figure 28:
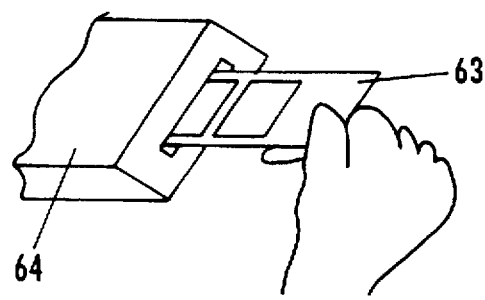
FIGS. 28–30 are the diagrams explaining the procedure of trimming method of the present inventive printing apparatus.
Figure 29:
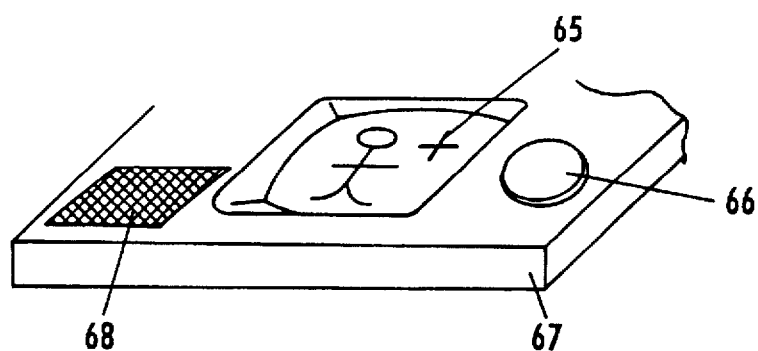
Figure 30:
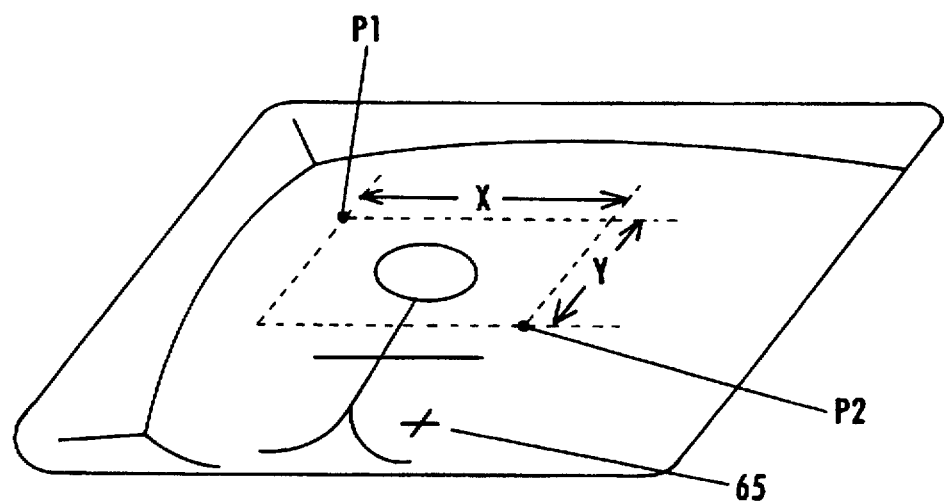
Figure 31:
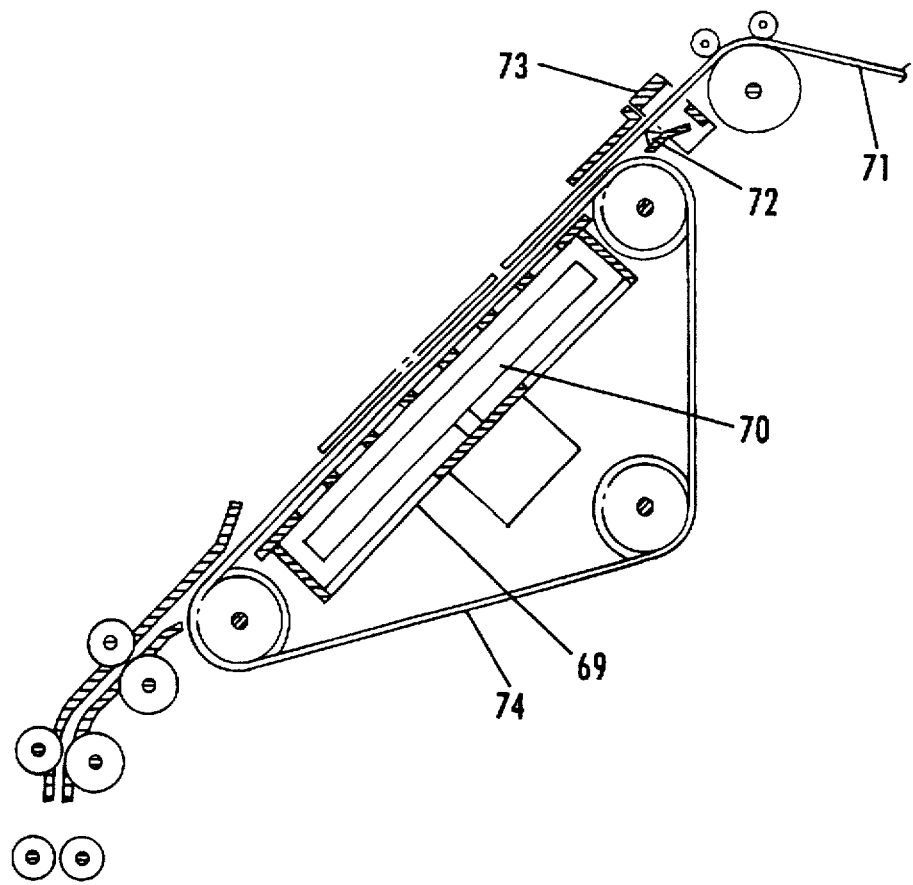
FIG. 31 shows a sectional view of one embodiment of exposure section of the present inventive print and development apparatus.
Figure 32:
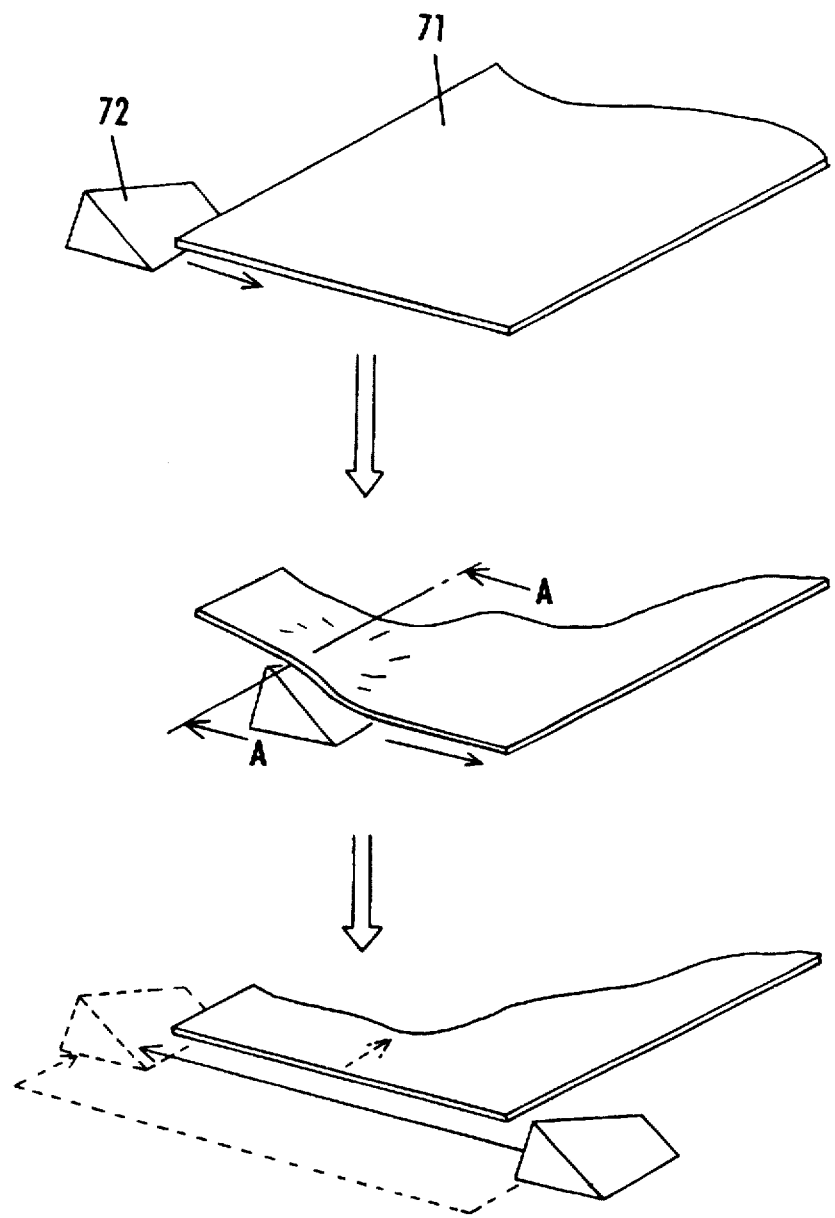
FIG. 32 is a diagram showing one embodiment of the cutting device of the present inventive print and development apparatus.
Figure 33:
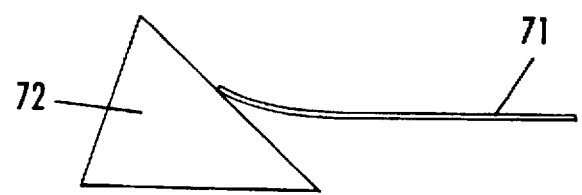
FIG. 33 shows a diagram for explaining the cutting of a photographic paper based on the embodiment of the cutting device of the present inventive print and development apparatus.
Figure 34:
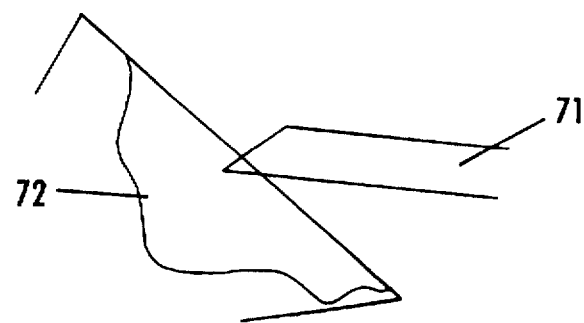
FIG. 34 is an enlarged partial diagram of FIG. 33 is the state of the photographic paper being cut.
Figure 35:
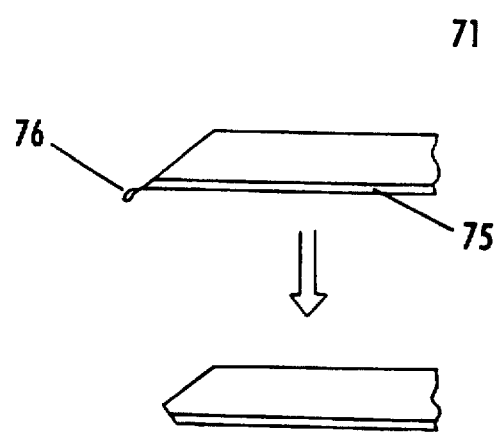
FIG. 35 shows an explanatory diagram of the state of cutting of a photographic paper by the cutting device of the present inventive print and development apparatus.
Figure 36:
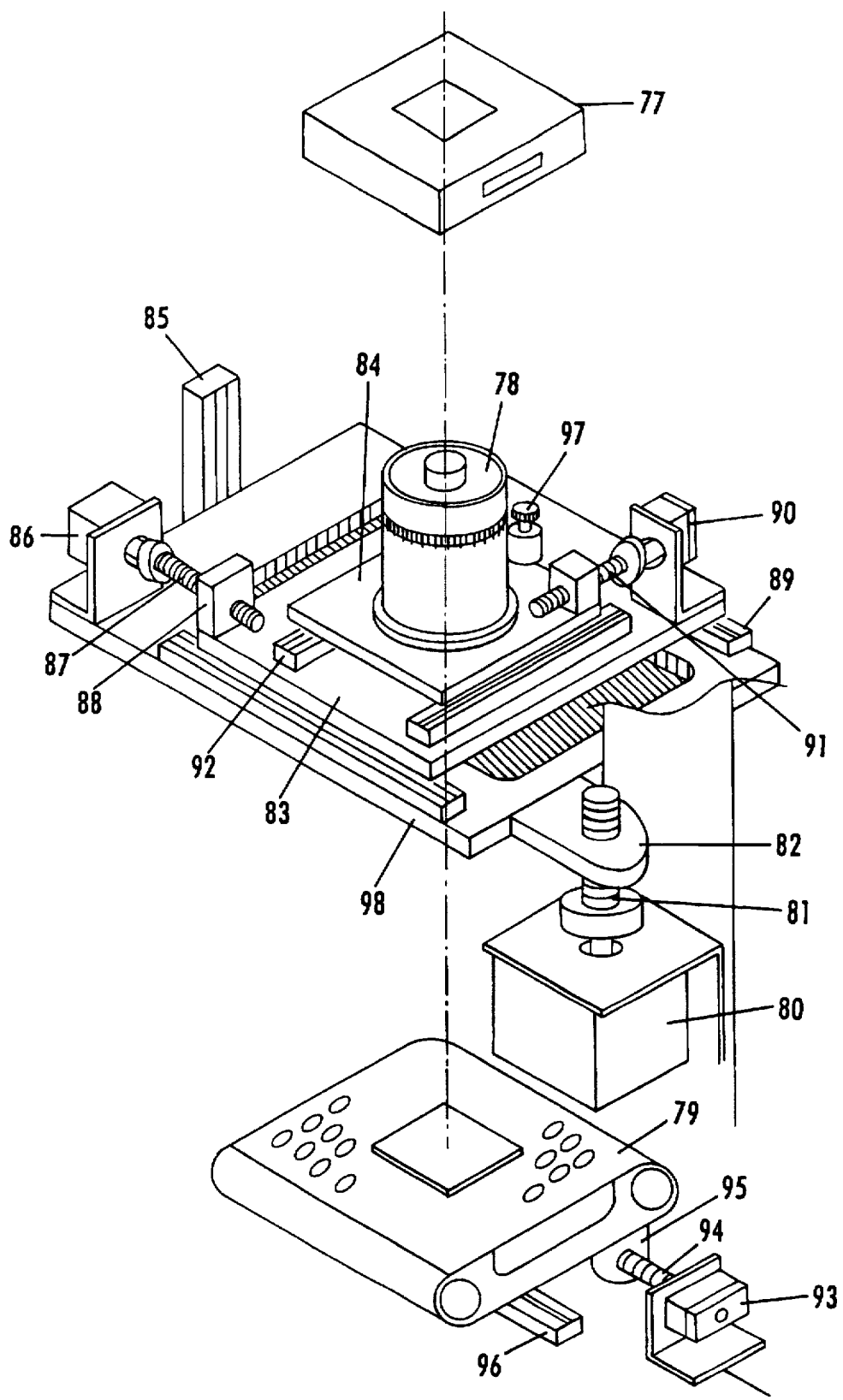
FIG. 36 is a perspective diagram of one embodiment of lens displacement mechanism of present inventive photographic print apparatus.

Detailed description of present inventive photographic printing methods and apparatuses are illustrated using diagrams. A perspective view of constitution of one embodiment of the present inventive photographic printing apparatus is shown in FIG. 36, where the chained line represents the light axis. Passing through the enlarging lens 78, the light axis of the negative mask 77 loaded with a negative film extends up to the photographic paper placed on the exposure station 79.

In the above embodiment, the negative mask 77 is secured while the enlarging lens 78 and the exposure station 79 both being mobile. In this example, the ball-screw 81 hat is turned by the motor 80 is connected to the lens plate 98 through the nut 82, and whereby, enlarging lens 78 can be moved up or down along the slide-rail 85 together with both of the lens plates 83 and 84 placed atop the said lens plate.

The lens displacement mechanism is such that, the ball-screw 87 that is turned by the motor 86 is connected to the lens plate 83 through the nut 88, and whereby, enlarging lens 78 can be moved horizontally along the slide-rail 89 together with the lens plate 84 placed atop the lens plate 83.

Likewise, a ball-screw 91 that is turned by the motor 90 is connected also to the lens plate 84 through a nut, and whereby, the enlarging lens 78 that is placed atop the lens plate 83 can be moved along the slide-rail 92.

Similarly, a ball-screw 94 that is turned by the motor 93 is connected also to the exposure station 79 through the nut 95, and whereby, the said exposure station can be moved along the slide-rail 96. Attached to the enlarging lens 78 is a motor 97 that is used for the purpose of adjusting lens focal point. The exposure surface can be moved perpendicular to the slide-rail 96 by rollers.

Figure 37:
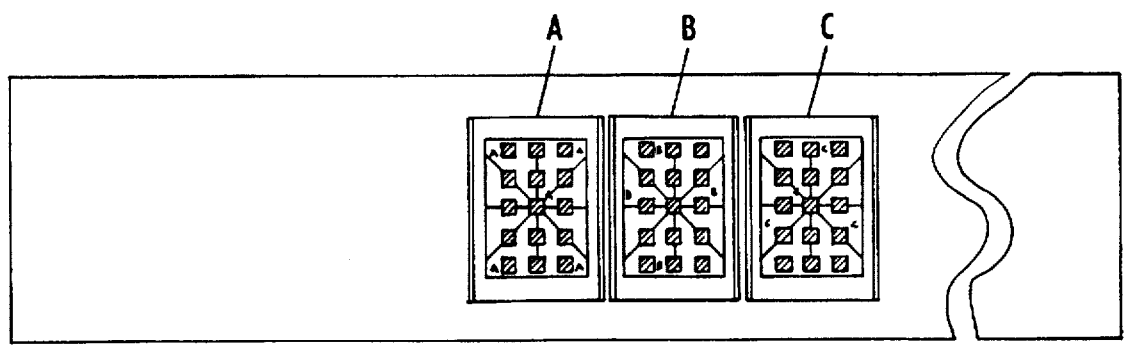
FIG. 37 is a diagram showing one embodiment of focus charts used in the present inventive photographic printing methods and apparatuses.

In accordance with the present inventive photographic printing methods and apparatuses, preparation of a sample print in the case of a three-frame negative film undergoing seven-exposures is explained below together with diagrams illustrating one embodiment. FIG. 37 is a diagram showing one embodiment of focus charts used in the present inventive photographic printing methods and apparatuses.

The focus chart used is of black-base and consists of three frames A, B and C that are spaced in the same pitch 18.5 mm as in 3D negatives. While each focus chart A, B and C has in the central region patterns that are equal in size and shape, differences are included in the patterns of peripheral region for A, B and C to be distinguished from each other. The term "central region" defines the region demarcated by 120×120 pixels of 481×512 pixels, which is the enlarged screen size on selecting the key-object and is equivalent to a 0.8×1 mm region on the focus chart This focus chart is subsequently printed using an enlarging lens of magnification factor 6, and this printed image is then projected onto a monitor by a CCD camera. If the bounds of this image is converted to dimensions on the focus chart, of the area 8×1 mm at the central region the image occupies the area 0.5×0.7 mm. Henceforth, this area is called the key-subject. At the center of the key-subject, there exists a cross consisting of line segments 10 μm thick and 70 μm long, and the point of intersection of the said lines is called the key-subject point. At the corners of the key-subject, patterns or letters are established so that the differences in the focus charts A, B and C are identifiable.

In the mode where only the first and fourth exposures are executed, the key-subject is chosen as the key-subject point, and is exposed onto a 2D photographic printing paper. In the first exposure, the focus chart A is printed while in the fourth exposure, the focus chart B is printed.

Figure 38:
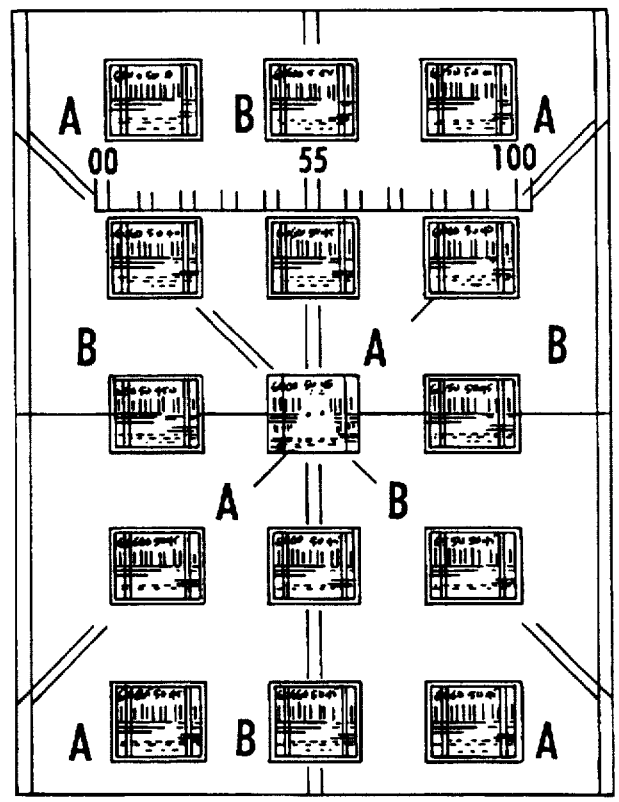
FIG. 38 is a diagram showing one embodiment of the sample print prepared from photographic printing methods and apparatuses of present invention.

FIG. 38 is a diagram showing one embodiment of the sample print prepared from present inventive photographic printing methods and apparatuses. The finished print has, as shown in the figure, dual images of the focus charts A and B. This print is selected as the sample print. If the mismatch is small, the lens plate correction is difficult to compute, and by having input a correction of about 0.1 mm from the beginning except for the case of the fourth exposure, a clear dual image can be obtained, which makes subsequent measurements easier.

Likewise, sample prints are prepared in the combinations of the fourth and seventh exposures, second and fourth exposures, fourth and seventh exposures and the like.

Figure 39:
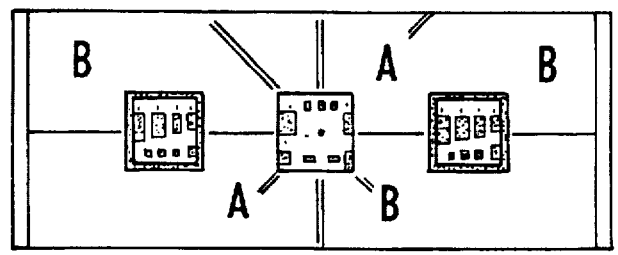
FIG. 39 shows a diagram illustrating one embodiment of a sample print cut after being prepared from photographic printing methods and apparatuses of present invention.

In the present embodiment, as a results of measurements on sample prints being made using the video camera installed in the printing apparatus for negative-detection, the top and bottom margins of the sample print are cut so that the sample print can be inserted into the negative mask. FIG. 39 shows a diagram illustrating one embodiment of a sample print cut after being prepared in accordance with photographic printing methods and apparatuses of present invention. The key-subject point is chosen to be the center of sample print, which is cut to a breadth of 34.9 to 35.0 mm. The direction of cutting is such that the edge of the photographic paper towards the side of door of negative mask when exposure took place is made the leading edge. In relation to the edge that is to become the leading edge of the photographic paper, the cut in the direction of the paper breadth should be precise and at right angle to the leading edge.

The photographic paper that is cut, is fed into the 3D negative mask from the leading edge, so that the key-subject point stops at the center of the mask-hole that is at the center of negative mask, and setting of the paper is then complete.

Figure 40:
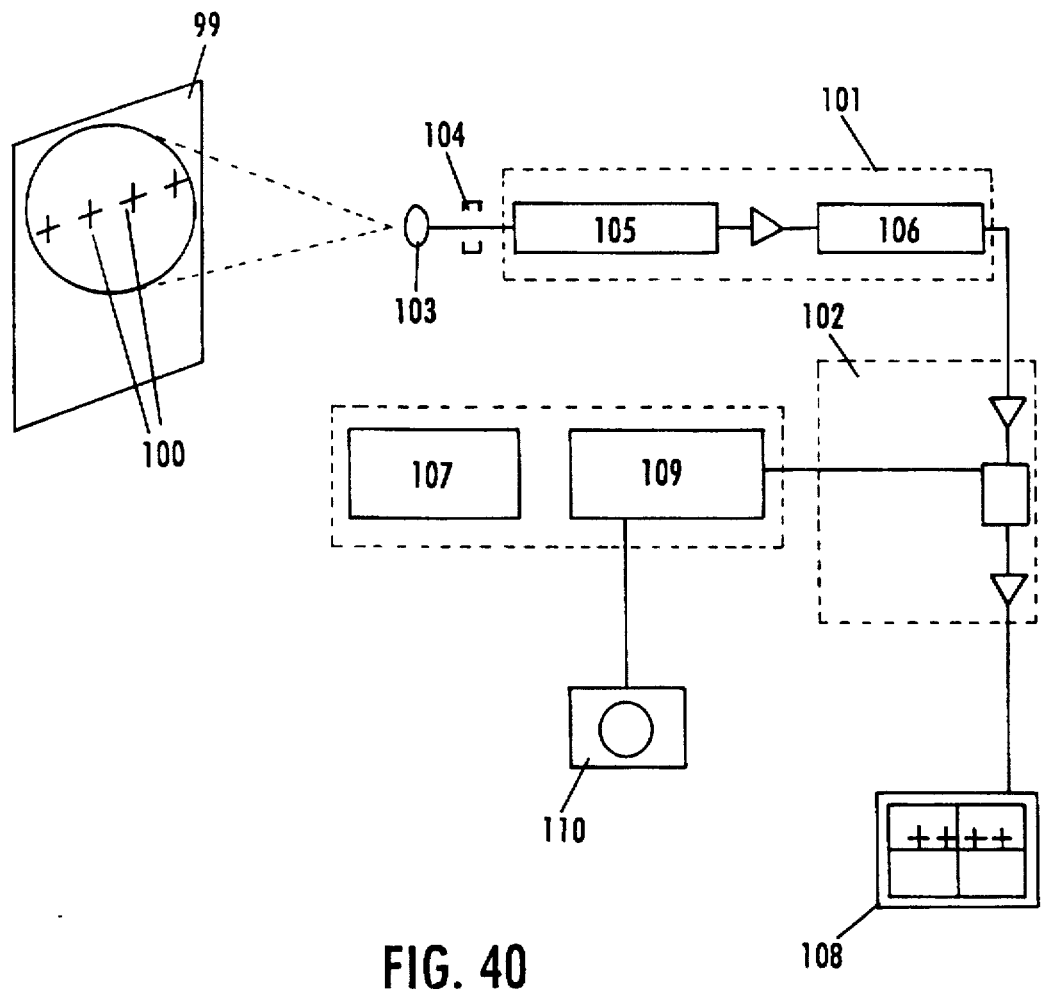
FIG. 40 is a diagram showing measuring device of sample print of photographic printing methods and apparatuses of present invention.

FIG. 40 shows a diagram of a measuring device of sample prints of present inventive photographic printing methods and apparatuses. A video camera 101 captures, as shown in FIG. 40, the cross marks 100 located at the exposure centers (key-subjects) of each of the focus-charts that are printed onto the sample print 99 secured in the negative mask, and transmits the images to image processing section 102.

Capturing by the video camera 101 is controlled by lens 103 and aperture 104 in addition to shutter 105 and gain 106 coupled with the camera controller 107.

Thus, transmitted image informations of the cross markings are converted in the image processing section 102 to image signals of television monitor 108, wherein the image is cast. Connected to the image processing section 102 via a letter-framework generating circuit 109, is a track-ball 110, which controls the cursor position on the television monitor 109.

Figure 41:
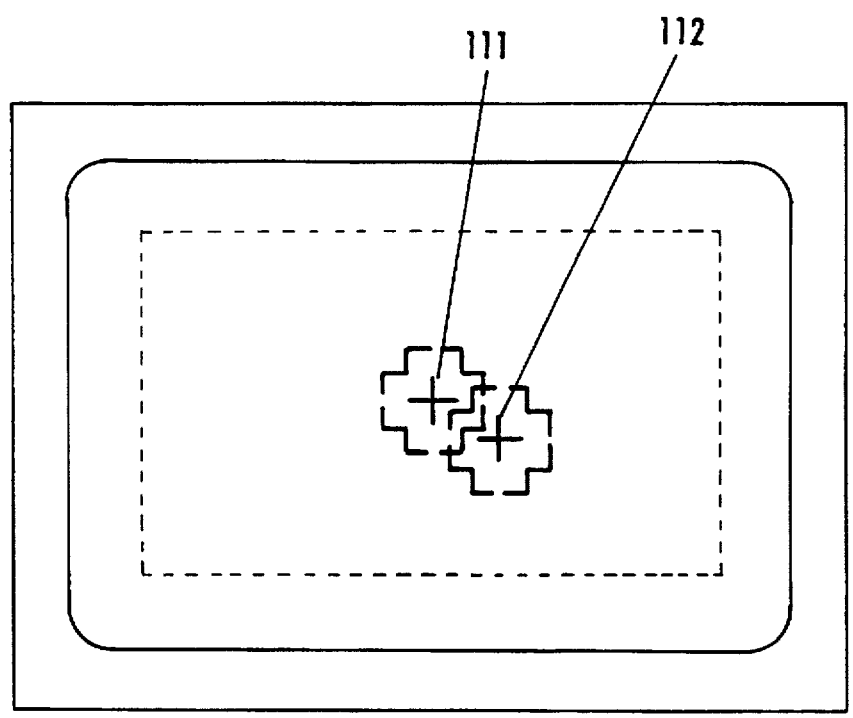
FIG. 41 is a schematic diagram showing an image on display of photographic printing methods and apparatuses of present invention.

FIG. 41 shows a schematic diagram of the display-screen of the present inventive photographic printing methods and apparatuses. The key-subjects are displayed in the region of 90×120 pixels. By specifying with a cursor or the like the key-subject points of exposure 1 and 4 indicated respectively by cross-points in the images of the cross-marks 111 and 112 of the focus charts A and B respectively, the mismatch between the two key-subjects are computed using the CPU.

Correction needed is then computed from said mismatch, and the correct positions for the exposure station and lens plates are obtained and registered for using prior to exposures, when the exposure station and the like are adjusted based on the registered values of positions, thus realizing automatic production of 3D photographs, in which the centers of exposures are coincident.

Figure 42:
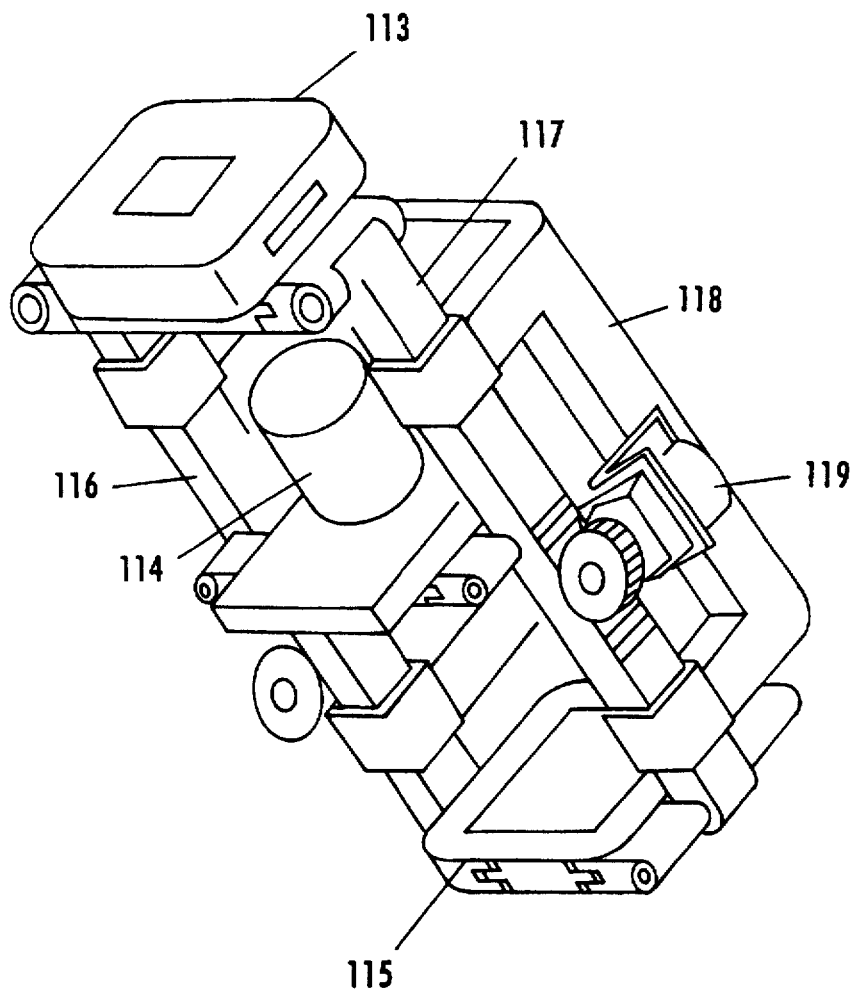
FIGS. 42–46 show perspective views of one embodiment of 3D photographic printing apparatus of present invention.

FIG. 42 shows a perspective view of one embodiment of 3D photographic printing apparatus of present invention. The sections consisting of negative mask 113, lens 114 and exposure station 115 are each hinged on two axial shafts 116 and 117 in such a manner as swinging is possible. In this construction, angles of rotation for each of the sections, negative mask 113, lens 114 and exposure station 115 are identical.

Rotational movement is accomplished by providing motion to each axial shaft by means of rack-and-pinion mechanism that is actuated by a drive motor 119 each secured to frame 118. By changing the ratio of the speeds of rotation of the two drive-motors, changing of position of center of rotation is possible.

Figure 43:
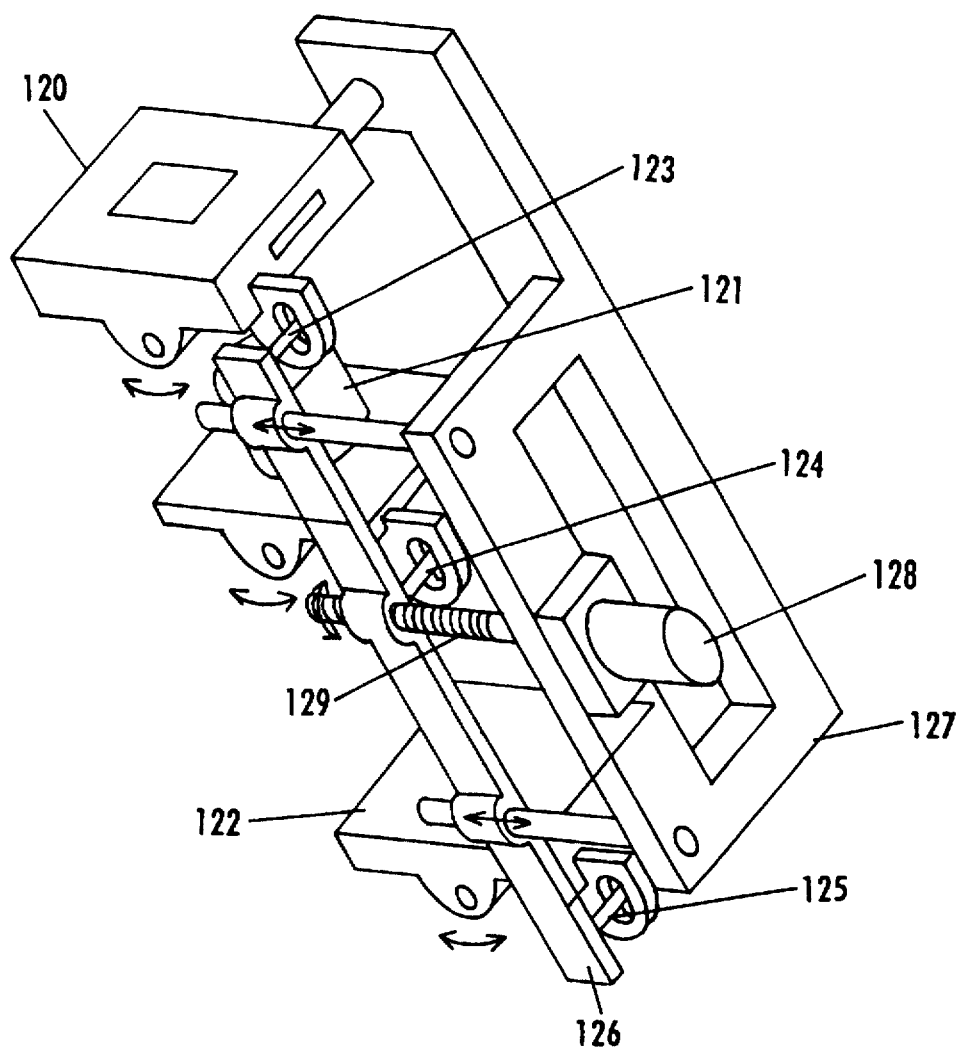

FIG. 43 shows a perspective view of another embodiment of present inventive 3D photographic printing apparatus. The sections consisting of negative mask 120, lens 121 and exposure station 122 are each attached to a shaft in such a manner as rotational motion is possible, and pins 123, 124 and 125 fixed on rod 126 interact with holes on blocks established on the negative mask 120, lens 121 and exposure station 122, constituting a construction in which positions of rotation can be controlled.

The drive motor 128 secured to frame 127 turns the rod 126 by the rotation of the ball-screw 129, and this motion is transmitted through the pins, 123, 124 and 125 rotates the sections consisting of negative mask 120, lens 121 and exposure station 122. In this construction, angles of rotation for each of the sections, negative mask 120, lens 121 and exposure station 122 are identical.

Figure 44:
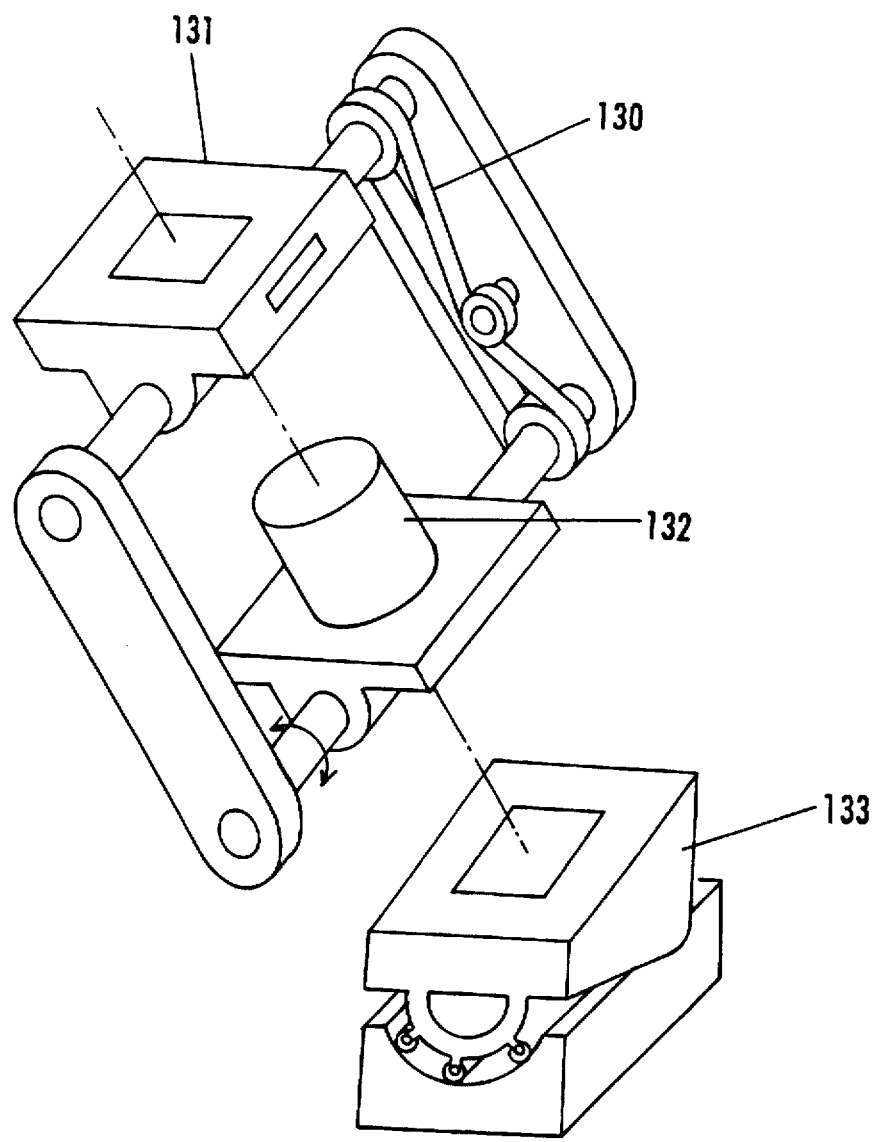
Figure 45:
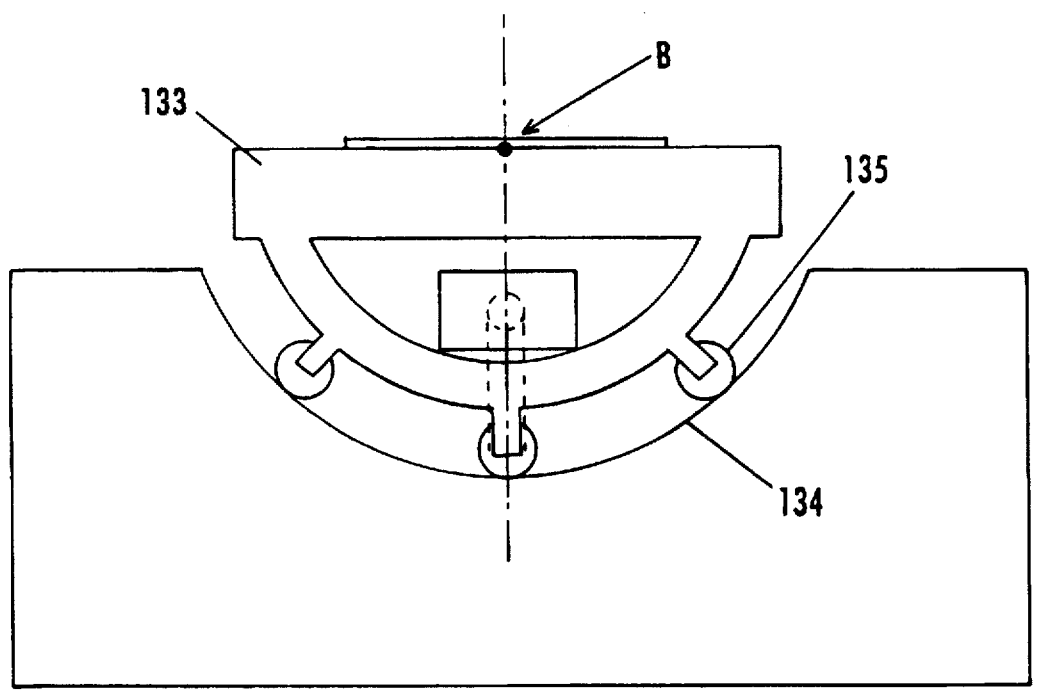

FIGS. 44 and 45 show perspective views of yet another embodiment of present inventive 3D photographic printing apparatus, where FIG. 45 being a partial enlargement of FIG. 44. In this embodiment, force required for rotating the sections consisting of negative mask 131 and lens 132 is transmitted through belt 130. The exposure station 133 of this embodiment is supported by rollers 135, as shown in FIG. 45, in a groove 134 of semicircular shape and rotated around point B. Rollers 135 are turned by a drive motor via a belt.

Figure 46:
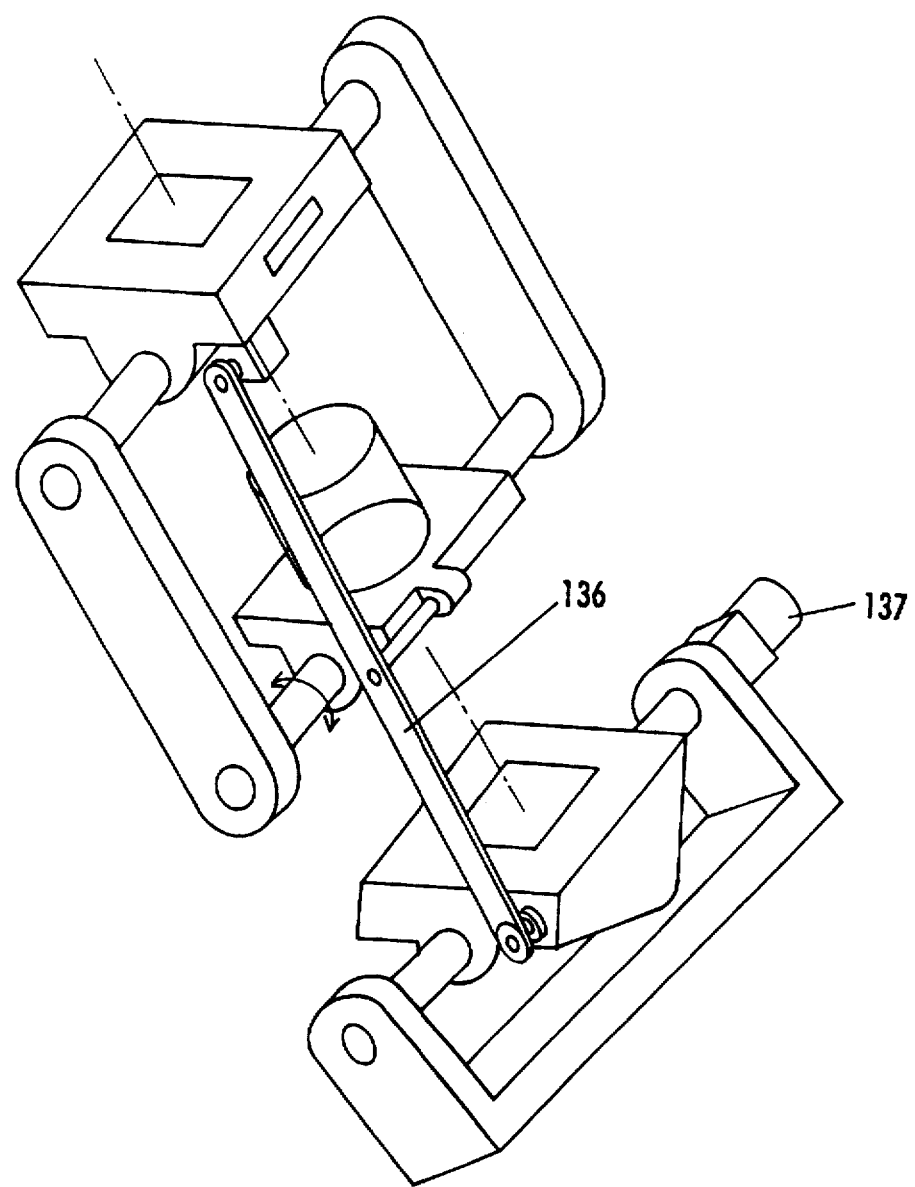
Figure 47:
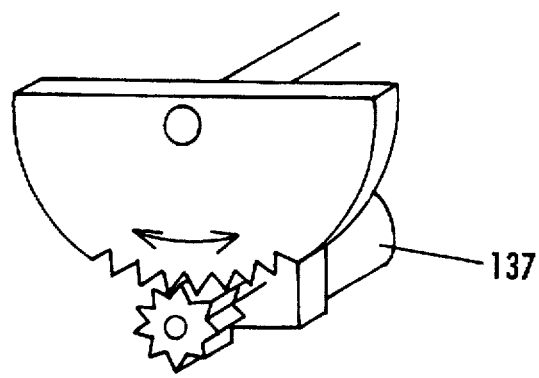
FIGS. 47–49 show diagrams illustrating one embodiment of the mechanism that provides reciprocating rotational movement in the present inventive 3D photographic printing apparatus.
Figure 48:
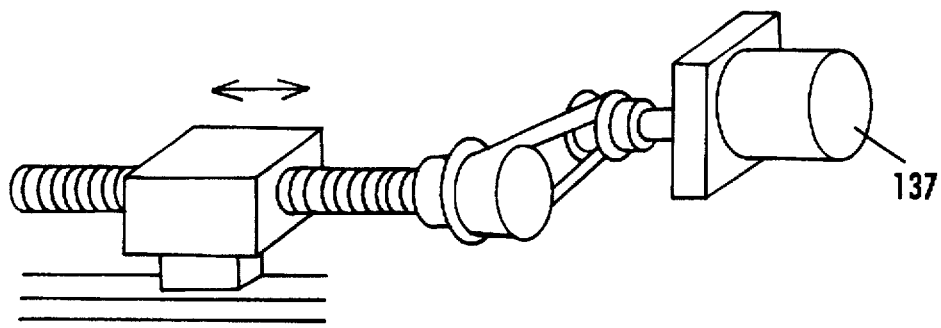
Figure 49:
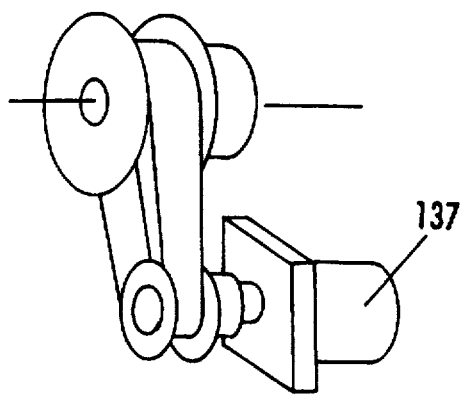

FIG. 46 shows a perspective view of still yet another embodiment of present inventive 3D photographic printing apparatus. Exposure station is moved by means of a motor 137 directly connected to the axis of the exposure station, the motion of which is transmitted to the sections consisting of negative mask and lens via a link 136. With the objective of putting the present 3D photographic printing apparatus into operation, rotational or translational motion can be obtained using mechanisms such as those shown in FIGS. 47, 48 and 49.

Although in the above, embodiments, angles of rotation of a multiple of members were devised to be identical by mechanical means, exposure can also be executed with the angles of rotation being controlled by means of a multiple of drive motors that turn each of said members.

Figure 50:
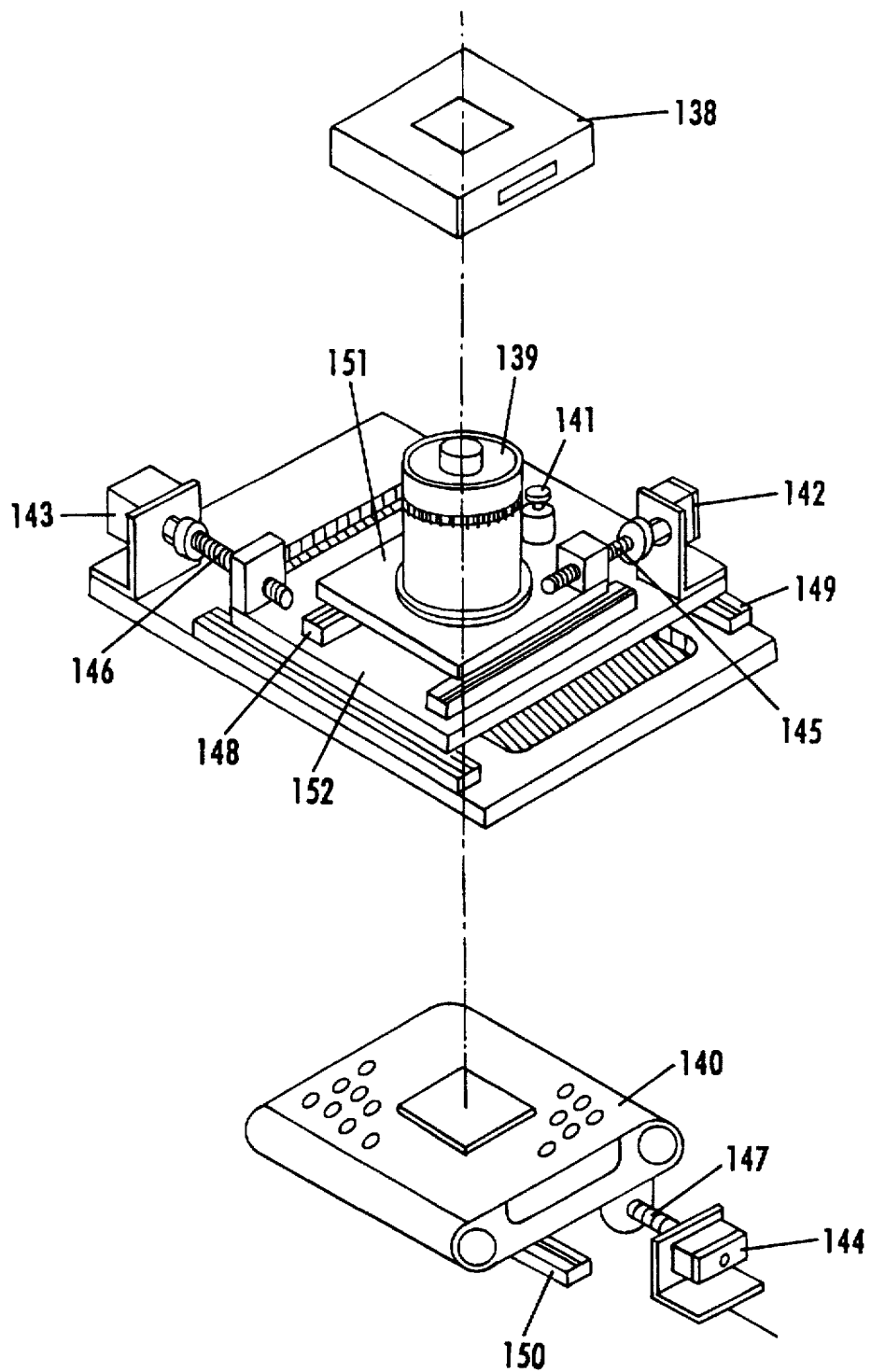
FIG. 50 shows in a perspective view one embodiment of the constitution of present inventive photographic printing apparatus.

FIG. 50 shows in a perspective view one embodiment of constitution of the present inventive photographic printing apparatus. The chained-line in the figure represents light axis. The light axis of the negative mask 138 loaded with a negative film extends, passing through the enlarging lens 139, up to the photographic paper placed on the exposure station 140. In the present embodiment, the negative mask is secured while the magnification lens and exposure station both being mobile.

In the embodiment depicted by the figure, ball-screws each turned by a motor and connected via a nut to either the lens plate or exposure station, move said lens plate and exposure station along slide rails. The enlarging lens 139 provided with a motor 141 for focal-point adjustment is secured on lens plate 151, a nut on which connects with a ballscrew 145. By turning this ball-screw with motor 142, plate 152 below the lens plate can be moved along on the slide rail 148.

The slide rail is fixed on the plate 152 below the lens plate, a nut whereon connecting said plate in the like manner as above to a ball-screw 146 that is turned by motor 143 moving the said plate 152 on top of the slide rail 149. Likewise, exposure station 140 connected by a nut to a ball-screw 147 that is turned by a motor 144 can also be moved on top of slide rail 150. In addition, exposure surface can be moved by means of rollers in a direction at right angle to the slide rails 150.

Figure 51:
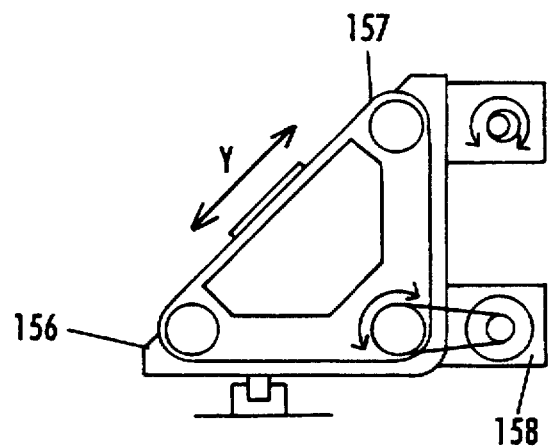
FIGS. 51–52 show in sectional views one embodiment of the mechanism adjusting exposure station position of the present inventive photographic printing apparatus.
Figure 52:
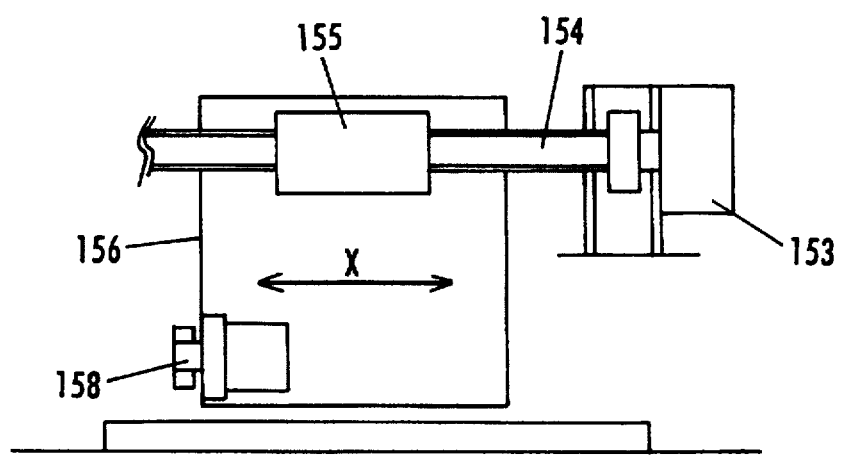

One embodiment of mechanism adjusting exposure station position of the present inventive photographic printing apparatus is shown in sectional views in FIGS. 51 and 52, of which FIG. 51 is the sectional view viewed along a roller axis and FIG. 52 is the sectional view on the vertical surface containing the roller axis.

The exposure station can be moved in the direction Y of the arrows as in FIG. 51, by means of a stepping motor 158 that turns a conveyor belt 157 that is stretched over the exposure station.

Photographic paper on exposure station is held in place by the suction force on said paper via perforations on the conveyor belt, originating in an internal suction box. As seen from FIG. 52, the exposure station 156 is connected via a nut 155 to ball-screw 154, which is turned by a stepping motor causing the exposure station to move in X direction.

Figure 53:
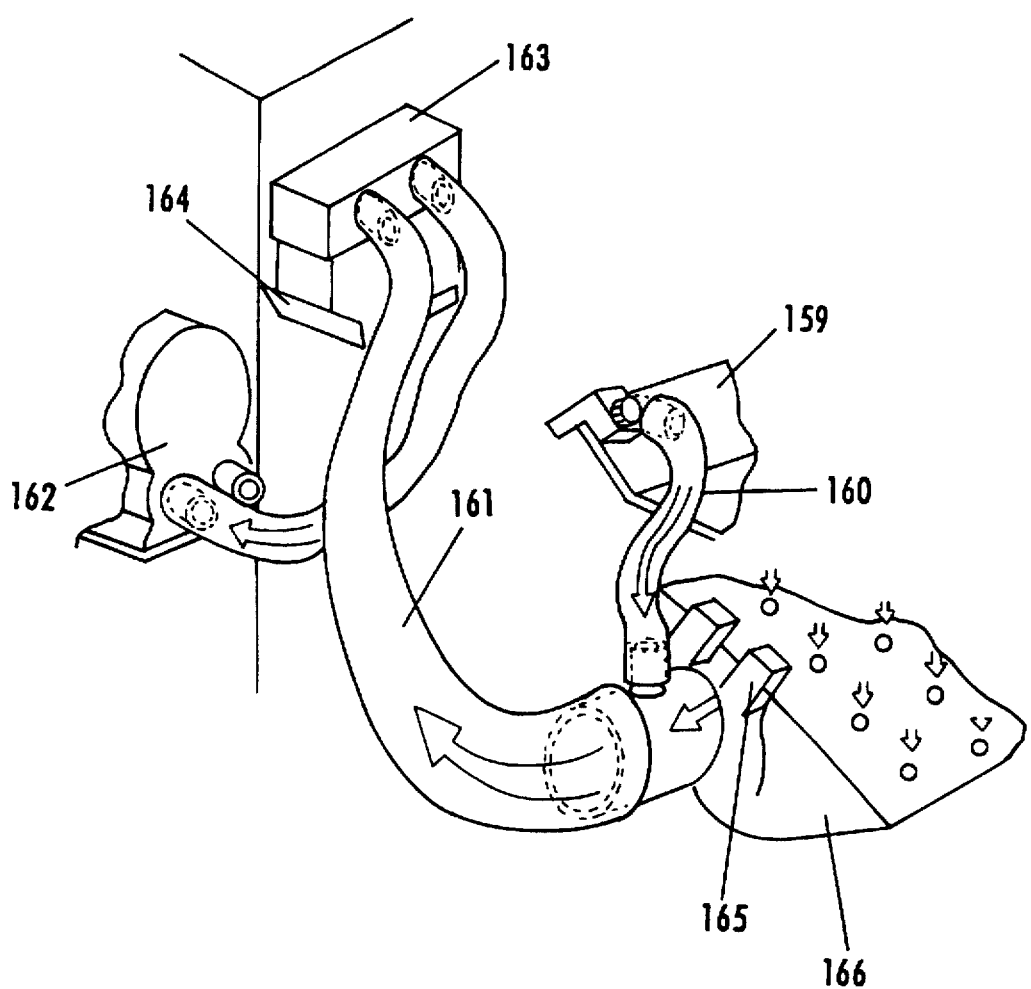
FIG. 53 shows one embodiment of machining mechanism of photographic papers of present inventive photographic printing apparatus.

FIG. 53 shows one embodiment of the mechanism of machining of photographic papers of present inventive photographic printing apparatus. Illustrated in the diagram are: a mobile blade moving along the guide 159, which is secured immediately after the cutting section; and a layout of waste-suction piping whereby cutting wastes are evacuated. The wastes of mobile blade are absorbed into the vacuum hose 160, which is fixed to an opening at cutting location. The absorbed wastes of cutting, passing through a heat-resistant duct 161, is moved into a waste-collecting casing 163 that is supported by a casing-holder 164, and is stored inside of a filter of the casing not shown in the figure. The hose 160 for waste evacuation is connected to the heat-resistant duct 161 at the location where the said heat-resistant duct is connected to the exposure station frame 165 of the suction chamber 166.

Figure 54:
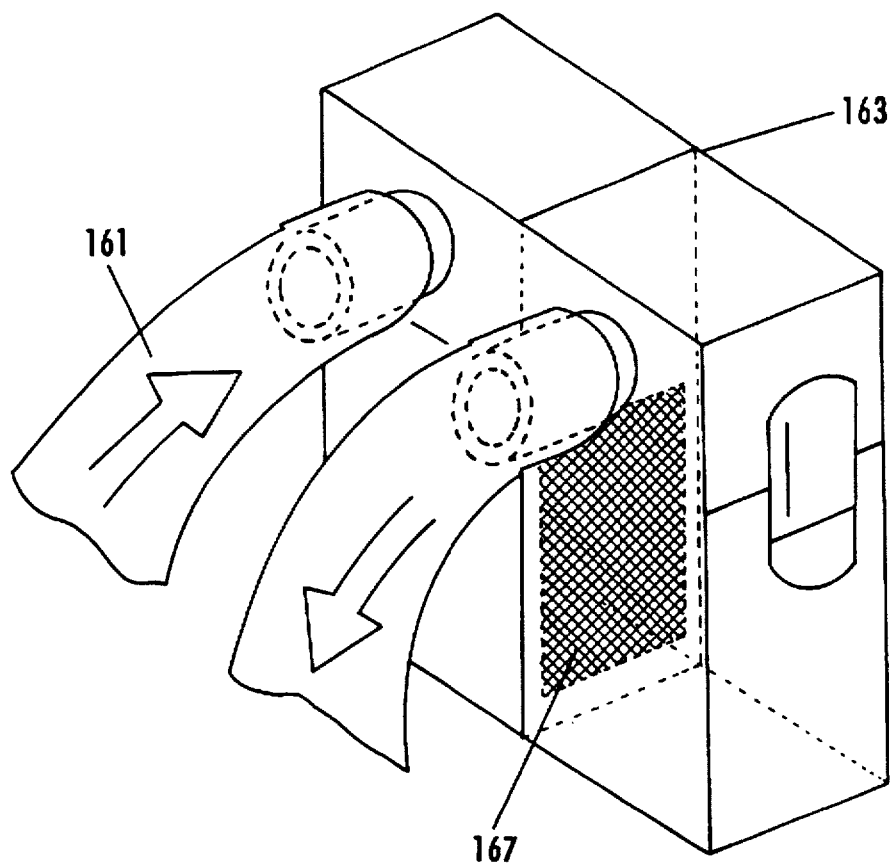
FIG. 54 is an enlarged diagram showing the embodiment of machining mechanism of photographic papers of present inventive photographic printing apparatus.

An enlarged diagram of one embodiment of cutting mechanism of photographic papers of present inventive photographic printing and development apparatus is shown FIG. 54, where the waste-collecting casing is shown. The waste-collecting casing is located near the inlet of suction fan, and collects via heat-removal duct 161 the wastes or dust coming from waste-suction hose and absorption or adsorption ducts. The inside of the dust-collecting casing is separated into two compartments by filter 167, which also serves as a partition. Said filter is of insertion-type and is replaceable. The wastecollecting casing, having been hooked onto a clasp on the case-holder by a protrusion on the casing, is secured by fixing one protrusion onto a clasp on the waste-collecting casing.

Figure 55:
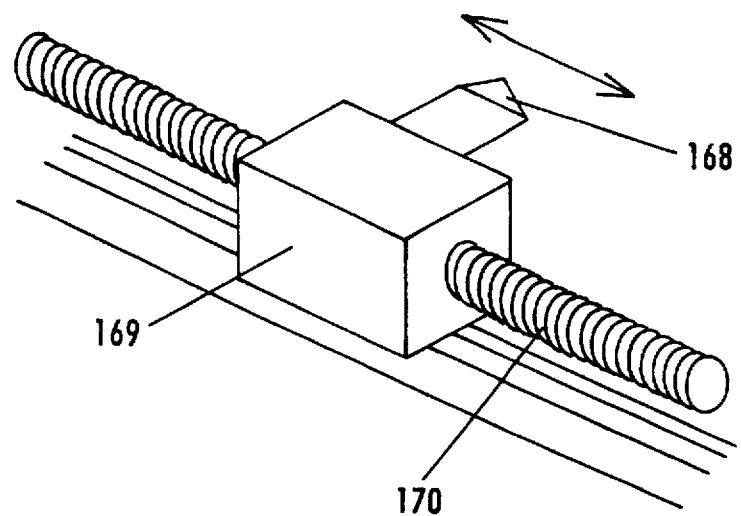
FIGS. 55–61 show one embodiment of the means of machining photographic papers of present inventive photographic printing apparatus.
Figure 56:
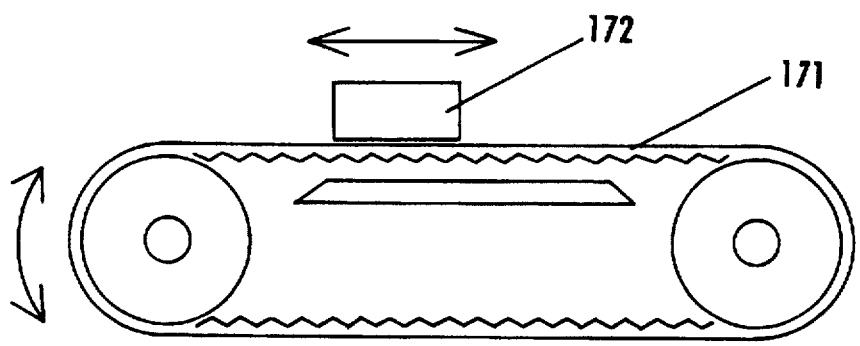

With regard to means of motion of mobile blade, a number of methods are illustrated in diagrams. FIGS. 55 to 61 show one embodiment of the means of cutting photographic papers of present inventive photographic printing and development apparatus. FIG. 55 shows a mobile blade 168 secured on holder 169, which is moved by the rotation of a ball-screw 170. FIG. 56 shows an embodiment where the holder 172 is moved having the said holder tied to the belt 171.

Figure 57:
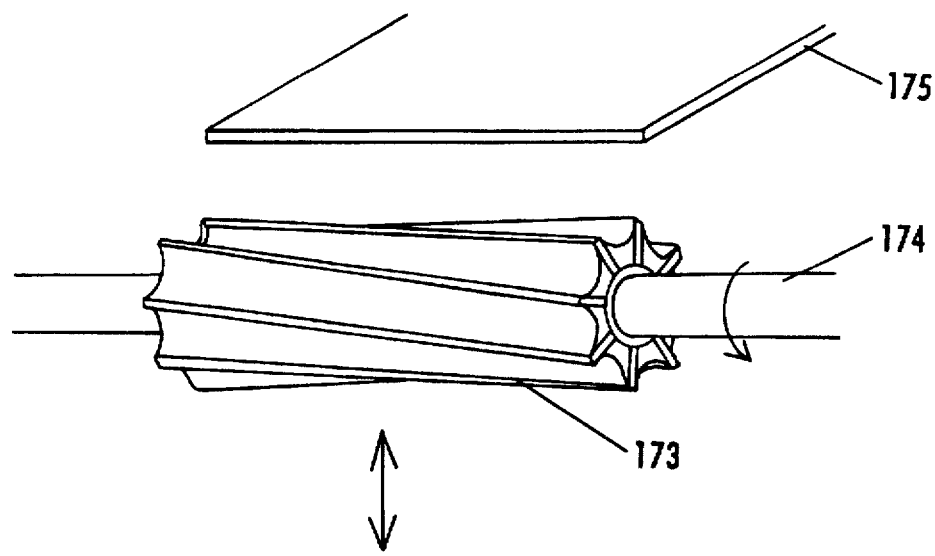
Figure 58:
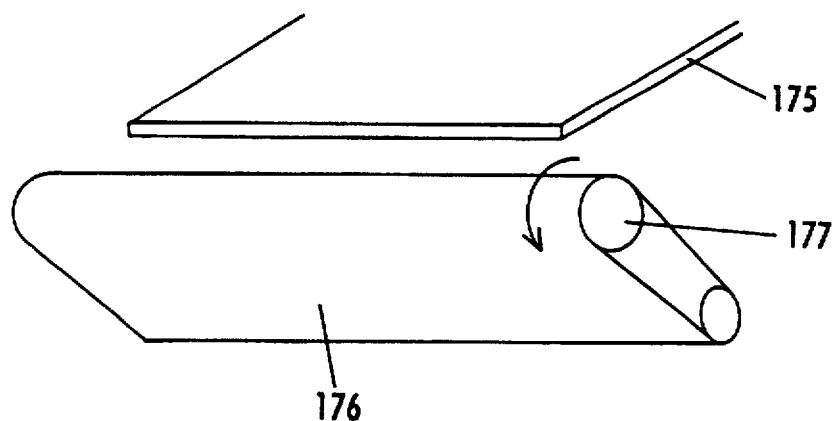
Figure 59:
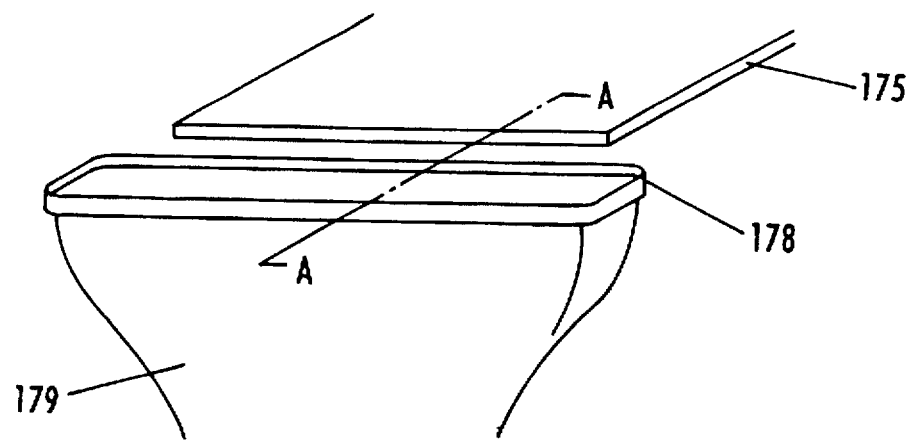
Figure 60:
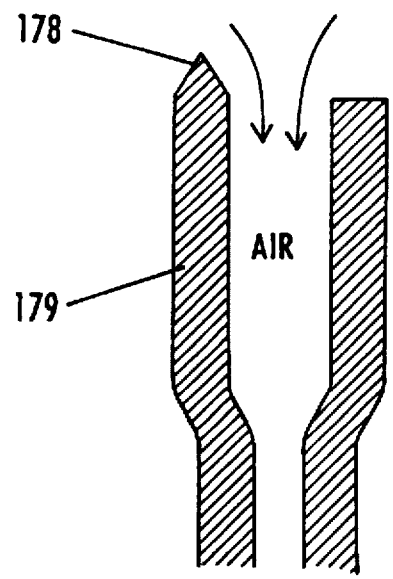
Figure 61:
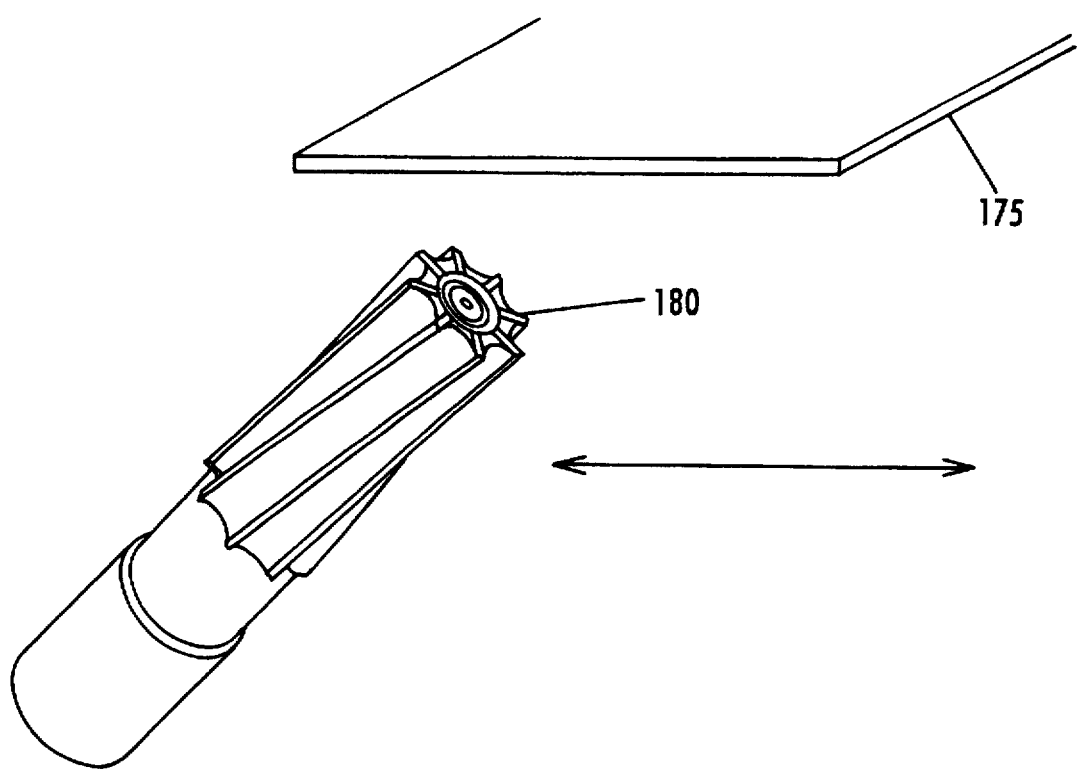

In addition to machining by reciprocating motion of a blade, various other means can be utilized such as: the method whereby residues of cutting on edges of photographic paper 175 can be machined by rotating the shaft 174 on which is fixed blade 173 as shown in FIG. 57; the method in which an abrasive endless-paper 176, as shown in FIG. 58, is turned by the rotation of roller 177 and brought in contact with the edge of photographic paper 175; the method in which wastes of cutting of edges by a blade 178 that is constructed as one integral part of duct 179, as shown in FIGS. 59 and 60, are separated and immediately absorbed; and the method in which an end-mill cutter 180 while being rotated is given a reciprocating motion.

Although the present invention has been described and illustrated by the preferred embodiments thereof, it is clearly understood that the same is not limited to such embodiments and is subject to various modification within the scope and spirit of the appended claims.

What is claimed is:

1. A three-dimensional (3D) photographic printing apparatus provided with an enlarging lens, comprising:

a lens supporting member for supporting said enlarging lens;

a guide member for moving said lens supporting member in a direction of a light axis of said enlarging lens; and means for controlling said guide member to position said enlarging lens at a first distance, adjacent a film negative, during 3D photographic printing operation of said 3D photographic printing apparatus and at second distance, greater than said first distance, during other operations of said 3D photographic printing apparatus.

* * * * *

UNITED STATES PATENT AND TRADEMARK OFFICE
CERTIFICATE OF CORRECTION

PATENT NO. : 5,786,909
DATED : July 28, 1998
INVENTOR(S) : Hiroshi Miyawaki, et al.

It is certified that error appears in the above-identified patent and that said Letters Patent is hereby corrected as shown below:

On the title page, item [75], add --Keiji Morimoto--.

Signed and Sealed this

Nineteenth Day of January, 1999

Attest:

Attesting Officer

*Acting Commissioner of Patents and Trademarks*